United States Patent
Bell et al.

(10) Patent No.: US 11,667,799 B2
(45) Date of Patent: Jun. 6, 2023

(54) COOPERATIVE GUIDANCE SYSTEM AND METHOD

(71) Applicant: INTELLIGENT MATERIAL SOLUTIONS, INC., Princeton, NJ (US)

(72) Inventors: Howard Y. Bell, Princeton, NJ (US); Joshua E. Collins, Philadelphia, PA (US); Robert A. Ferlis, McLean, VA (US); Kunik Lee, McLean, VA (US)

(73) Assignee: INTELLIGENT MATERIAL SOLUTIONS, INC., Princeton, NJ (US)

( * ) Notice: Subject to any disclaimer, the term of this patent is extended or adjusted under 35 U.S.C. 154(b) by 170 days.

(21) Appl. No.: 17/147,818

(22) Filed: Jan. 13, 2021

(65) Prior Publication Data

US 2021/0165417 A1  Jun. 3, 2021

Related U.S. Application Data

(63) Continuation of application No. 16/080,790, filed as application No. PCT/US2017/019913 on Feb. 28, 2017, now Pat. No. 10,921,815.

(Continued)

(51) Int. Cl.
*A45B 3/00* (2006.01)
*C09D 5/22* (2006.01)
(Continued)

(52) U.S. Cl.
CPC ............ *C09D 5/22* (2013.01); *G05D 1/0088* (2013.01); *G05D 1/0236* (2013.01); *G05D 2201/0213* (2013.01); *G06V 10/225* (2022.01)

(58) Field of Classification Search
CPC .... A45B 3/00; A45B 3/02; A45B 9/04; Y10S 135/91; Y10S 135/911; A61H 3/00; A61H 3/068
(Continued)

(56) References Cited

U.S. PATENT DOCUMENTS

| 3,046,851 A | 7/1962 | De Vries |
| 3,136,733 A | 6/1964 | Ross et al. |

(Continued)

FOREIGN PATENT DOCUMENTS

| CN | 103180132 A | 6/2013 |
| WO | WO2007/056820 A1 | 5/2007 |

OTHER PUBLICATIONS

English Translation of First Office Action and Search Report for corresponding CN Application No. 2017800157476, dated Apr. 16, 2021.

(Continued)

*Primary Examiner* — Dalena Tran
(74) *Attorney, Agent, or Firm* — Meagher Emanuel Laks Goldberg & Liao, LLP

(57) ABSTRACT

A cooperative vehicle-highway communication system allows vehicles and pedestrians to determine their location by sensing selected coatings on roadways, sidewalks, and other paved surfaces in both indoor and outdoor environments. The systems recognize intelligent materials under sensors to determine geo-location. The intelligent materials are incorporated into paints on the roadway surface to mark key locations. Additionally, vehicles recognize highway paint/markings and signs with intelligent paint that provide specialized message content to support driver information and control applications. The intelligent paint materials include a coating that absorbs light while converting the absorbed light to electromagnetic energy. This electromag- (Continued)

netic energy is read by sensors to recognize the materials. The sensors transform the electromagnetic energy into processing signals to determine operating characteristics of the vehicle, including position and motion characteristics, and to provide operation actions of the vehicle. For mobility impaired pedestrians, the precisely defined geo-locations

11 Claims, 25 Drawing Sheets

Related U.S. Application Data

(60) Provisional application No. 62/301,249, filed on Feb. 29, 2016.

(51) Int. Cl.
*G05D 1/00* (2006.01)
*G05D 1/02* (2020.01)
*G06V 10/22* (2022.01)

(58) Field of Classification Search
USPC ......... 363/102, 577; 359/599, 641; 362/102, 362/577; 701/23
See application file for complete search history.

(56) References Cited

U.S. PATENT DOCUMENTS

| | | | |
|---|---|---|---|
| 3,321,329 A | 5/1967 | De Vries | |
| 3,474,057 A | 10/1969 | De Vries | |
| 5,277,839 A | 1/1994 | Schultz | |
| 5,349,026 A | 9/1994 | Emmons et al. | |
| 5,371,148 A | 12/1994 | Taylor et al. | |
| 5,665,793 A | 9/1997 | Anders | |
| 5,674,698 A | 10/1997 | Zarling et al. | |
| 5,874,491 A | 2/1999 | Anders | |
| 6,005,024 A | 12/1999 | Anders et al. | |
| 6,039,894 A | 3/2000 | Sanjurjo et al. | |
| 6,132,642 A | 10/2000 | Kane | |
| 6,143,200 A | 11/2000 | Akiwa | |
| 6,159,686 A | 12/2000 | Kardos et al. | |
| 6,379,584 B1 | 4/2002 | Yocom et al. | |
| 7,338,704 B2 | 3/2008 | Decker et al. | |
| 8,298,441 B1 | 10/2012 | Kasson et al. | |
| 8,337,035 B2* | 12/2012 | Lu | A45B 3/04 362/102 |
| 8,746,264 B2* | 6/2014 | Gorey | A63C 11/225 135/65 |
| 8,771,085 B1* | 7/2014 | Clyde | G06F 1/1698 463/47.4 |
| 8,858,401 B2* | 10/2014 | Kaupe | A45B 1/02 135/65 |
| 9,133,318 B2 | 9/2015 | Greer et al. | |
| 9,181,477 B2 | 11/2015 | Collins et al. | |
| 10,429,058 B2* | 10/2019 | McKean | B25G 1/01 |
| 2004/0156531 A1 | 8/2004 | Retterath et al. | |
| 2004/0195548 A1 | 10/2004 | Hampden-Smith et al. | |
| 2007/0194248 A1* | 8/2007 | Belov | G01J 1/58 250/458.1 |
| 2008/0251110 A1* | 10/2008 | Pede | A61H 3/068 701/532 |
| 2012/0064134 A1 | 3/2012 | Bourke, Jr. et al. | |
| 2013/0153118 A1 | 6/2013 | Friedrich | |
| 2013/0184938 A1 | 7/2013 | Dolinar et al. | |

OTHER PUBLICATIONS

International Search Report for PCT/US2017/019913 dated Jun. 6, 2017.
Howstuffcomares. Oil-Based Paint Versus Water-Based Paint. 2013. [Retrieved from the Internet on Apr. 12, 2016]. Retrieved from the Internet: http://www.howstuffcompares.com/doc/o/oil-based-paint-vs-water-based-paint.htm. pp. 1,3,4. date is not available.
Extended European Search Report received in European Application No. 17760595.3; dated Nov. 5, 2019.
Anonymous: "Nemoto & Co., Ltd. / Products & Services", Dec. 5, 2008 (Dec. 5, 2008), XP055635924, Retrieved from the Internet: URL:https://web.archive.org/web/20081205120711/http://www.nemoto.co.jp/en/products/luminova.html [retrieved on Oct. 25, 2019].

\* cited by examiner

Transmission Spectra of Various
Plastic Plates (thickness of 2 mm) by UH4150

Sample A (red) - NaYF4;Yb,Tm

Sample D (green) - LiYF4;Yb,Tm

Sample E (blue) - NaYF4;Yb,Tm

COOPERATIVE GUIDANCE SYSTEM AND METHOD

CROSS REFERENCE TO RELATED APPLICATIONS

This application claims priority to U.S. Provisional Application No. 62/301,249, filed on Feb. 29, 2016. This application incorporates by reference the entire contents of the U.S. Provisional Application No. 62/301,249.

STATEMENT REGARDING FEDERALLY SPONSORED RESEARCH

This invention was made in the performance of Cooperative Research and Development Agreement No. FHWA-2015-01 with the Federal Highway Administration, Department of Transportation. The Government of the United States has certain rights in the invention.

TECHNICAL FIELD

The invention generally relates to the field of intelligent transportation and more specifically relates to multi-mode vehicle-highway cooperative communications to improve traffic safety and traffic efficiency.

BACKGROUND

The metropolitan environment as we know it is poised to undergo dramatic change. Autonomous vehicle networks, recently a staple of science fiction, will soon have visible impacts on traffic flow in cities throughout the U.S. and cities around the world. Such transformational changes will affect the existing "ecosystem" of automotive traffic—both human-controlled and, increasingly, autonomous—and its interactions with pedestrians who must continue to live, work, and walk through these environments.

Additionally, road collisions are the world's leading cause of death for 15- to 29-year olds. While automobile manufacturers have invested in vehicle safety technology, the same level of investment has not occurred when it comes to traffic management. Only recently have new traffic management apps come to market to help make travel safer. Some apps show live traffic updates and allow drivers to plan their routes well. Other apps notify drivers if they have committed traffic violations to help track and curb offenses.

While these apps provide an additional measure of travel safety, there have been few efforts to make roadways and other travel routes safer. The Netherlands launched a "smart highway" concept, which features luminescent lane lines to improve road safety in Europe. Another invention, High Friction Surface treatments improve safety by making pavement less slick when it rains. Center-line rumble strips alert drivers to lane drift. Through similar innovations, road design is finally getting the attention that it deserves. Many urban innovation companies focus on working towards smarter mobility. However, to date, travel apps, highway engineering, environmentally sustainable road design, and other initiatives have provided only minimal improvements in travel safety. This inevitable future provides an opportunity to make intelligent use of changes to the automotive ecosystem for the mutual benefit of both automotive and pedestrian populations.

SUMMARY

The invention provides systems and methods for vehicles and pedestrians to determine their location by sensing selected coatings on roadways, sidewalks, and other paved surfaces in both indoor and outdoor environments. The invention provides cost effective techniques for connected vehicles and pedestrians to accurately determine their location in any environment. For instance, the systems of the invention recognize materials under sensors mounted to vehicles or under "white" canes used by the blind to reliably and timely determine geolocation. The materials and systems of the invention are incorporated into a roadway paint/markings (e.g., clear, colored, or opaque) and located on the roadway surface to mark key locations (e.g., stop bars, milestones, etc.). Additionally, vehicles recognize standard highway paint/markings and signs with specialized message content to support driver information and control applications. The materials of the invention incorporate crystalline rare earth phosphors that absorb light while converting to (or from) visible or infrared wavelengths. This converted light is then read by sensors mounted on the vehicles to recognize the materials. The sensors transform the converted light into processing signals that are then used to determine operating characteristics of the vehicle, including position and motion characteristics, and to provide operation actions of the vehicle, including motion and speed (e.g., acceleration, deceleration, braking, stopping, etc.) and position (e.g., turn, forward, reverse, etc.). For mobility impaired pedestrians (e.g., visually, cognitively, and other physical impairments), the intelligent system enables precise gee-location defining sidewalks, intersections, bus stops, restrooms, and the like, leading to an improved situational awareness.

The invention utilizes "intelligent paints" to establish "intelligent networks" that identify, guide, and protect pedestrians and motorists alike. The invention provides intelligent transportation related to multi-mode vehicle-highway cooperative communications that improve traffic safety and traffic efficiency. Similarly, the invention includes airfield markings that provide precise, real-time air field traffic control on airfield vehicles such as aircraft, buses, trams, mowers, and the like. The systems of the invention also provide warehouse traffic control for workplace automation and safety. Likewise, the systems and methods of the invention provide guidance for aerial and land based drones and other robotics.

The value of cooperation between roadways and vehicle systems to support applications providing driver information and vehicle control continues to grow. The invention incorporates crystalline rare earth phosphors mixed with paint or other coatings or present in other preformed traffic markings, applied to the roadway surface or other markers, which are recognized by sensors mounted on a vehicle so that the vehicle systems receive data that characterize the travel of the vehicle (e.g., speed, direction, etc.) and that characterize the roadway (e.g., lane dividers on highways, turn lanes, road shoulders, etc.). The system then uses the received data to augment or to autonomously operate the vehicle. Other uses include the identification of the locations of stop lines at intersections and the reliable identification of specific locations on roadways to confirm and/or correct other location data, such as the location data provided by the vehicle's GPS or other location system.

A cooperative guidance system of the invention includes an intelligent paint coating composition that includes a resin and a rare earth crystalline phosphor. The invention can also include a pavement marking material that includes a thermoplastic resin and a rare earth crystalline phosphor. A cooperative guidance system of the invention also includes a highway surface coated with an intelligent paint composition having at least one crystalline rare earth phosphor. The highway surface can be a roadway upon which the vehicle travels, an airfield upon which the vehicle travels. The highway surface can also be a highway sign, such as a speed limit sign, a stop sign, a yield sign, a highway name sign, and the like.

The intelligent paint absorbs light and converts the absorbed light to electromagnetic energy. The electromagnetic energy can be energy in the visible light spectrum, the infrared spectrum, and the radio frequency spectrum.

The system also includes a sensor coupled to a vehicle, where the sensor senses the electromagnetic energy from the intelligent paint and transforms the electromagnetic energy into a processing signal. The system also includes a processor that identifies the processing signal and determines an operating characteristic of the vehicle and/or a characteristic of the highway surface based upon the identified processing signal. The processor can identify a crystalline rare earth phosphor material compound or mixture of crystalline rare earth phosphor materials in the intelligent paint based upon the identified processing signal. The processor can identify the processing signal and determine a location of the vehicle based upon the identified processing signal. The processor provides operational actions to the vehicle based upon the identified processing signal. The operational actions to the vehicle based upon the identified processing signal can include accelerating, decelerating, maintaining a constant speed, braking, stopping, turning, providing a warning signal, and the like.

A cooperative guidance system of the invention can also include a global positioning satellite (GPS) device and/or a position unit. The position unit can calculate the location of the vehicle in global coordinates, and the GPS device can synchronize to location information from the processing signal. Further, a system of the invention can also include an image processing unit that converts spatial information received by the sensor into a plane image and calculates a spatial relationship between the vehicle and a travel path of the vehicle.

A system of the invention can determine an operating characteristic of a vehicle and/or a characteristic of a highway surface. The system pulses light onto a highway surface coated with an intelligent paint. The system receives electromagnetic energy back from the intelligent paint into a sensor based on a time rise and/or a time decay property of the crystalline rare earth phosphor. As outlined above, the system transforms the electromagnetic energy received by the sensor into a processing signal, identifies the processing signal, and determines an operating characteristic of a vehicle and/or a characteristic of the highway surface based upon the identified processing signal.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 3A-31 show data plots from the label signal at different vehicle speeds.

FIG. 7 shows an example vehicle and pedestrian communications system of the invention using intelligent paints with unique and distinguishable optical signatures.

FIGS. 8A-8C and FIG. 9 show example airfield communications systems of the invention using intelligent paints with unique and distinguishable optical signatures.

FIG. 10 shows a "white" cane used by the visually-impaired modified with a sensor of the invention tuned to the optical signatures of intelligent paint used in roadway markings.

FIG. 11 illustrates an example cooperative communication system linking multiple vehicles and pedestrians.

FIG. 12 shows an example interaction of light with intelligent paint in accordance with the invention.

FIG. 13 shows transmission spectra of a number of plastic compositions.

FIG. 14 shows solar radiation spectrum and resulting optical windows.

FIG. 15 shows mid infrared emissions of a number of rare earth phosphors.

FIG. 17 shows the power density dependence for an upconversion process of a rare earth phosphor when excited using 1.570 um lasers.

FIG. 18 depicts the NIR upconverted emission of the Y2O2S:Yb,Eer excited at 1.570 um.

FIG. 19 shows the lifetime tunability of Yb,Er doped phosphor excited using 980 nm and lifetime measurements recorded at 1540 nm.

DETAILED DESCRIPTION

The cooperative guidance systems and methods use intelligent materials, including intelligent paints, that entail reading information from crystalline rare earth phosphors or mixtures of crystalline rare earth phosphors. The systems of the invention operate in a similar fashion as human visual sensory operates. In human visual sensory operation, photons from the sun or from other emission sources, such as light bulbs, bounce from objects and enter the eyes, and through a complex system are converted to electrical signals and are compared to stored memories.

The rare earth elements are complex materials with completely full outer orbital shells (i.e., full of electrons). As the atomic number of the rare earth elements increases, the electrons are added to an unfilled inner orbital shell. For example, Lanthanum has zero electrons and Lutetium has 14 in the fourth orbital shell.

Controlled crystallization of the rare earths in predetermined ratios and host lattices yield crystalline rare earth phosphor structures capable of converting light up and down the electromagnetic spectrum. Such rare earth phosphors have been described in U.S. Pat. No. 9,181,477 and are available from Intelligent Material Systems, Inc. of Princeton, N.J. The crystalline rare earth phosphors in the invention include three components. The host, the absorber, and the emitter. The host is usually a material that is optically compatible with selected do pants, chosen to maximize the quantum efficiency of the system. Systems of the invention use Yttrium and Lanthanum, for example. Y and La are inexpensive because of their abundance in the earth's crust, and they are manufacturing byproducts of magnetic rare earths such as Nd and Dy.

Host compositions include as oxysulfides, oxides, halides, garnets, nitrides, sulfides. The host is modified with a rare earth or multiple rare earth elements (M), selected from one or more of the following rare earths including Yttrium, Lanthanum, Cerium, Praseodymium, Neodymium, Samarium, Europium, Gadolinium, Terbium, Dysprosium, Holmium, Erbium, Thulium, Ytterbium and Lutetium. Each rare earth provides distinct, measurable optical properties. Examples include: $Y(1-x-y)_2O_2S:Yb(x=0.00S-0.S)$-, $Er(y=0.00S-0.S)$, whereby x and y can be any selection of the rare earths listed above.

Common infrared absorbers are Ytterbium and Samarium. Photons hit the crystal, and the energy is transferred to the "emitters," such as erbium, europium and thulium. Phase purity of the rare earth crystals with few lattice defects are important characteristics for efficient energy exchange. The absorbers are chosen based on the Dieke Diagram as it outlines rare earth energy level diagrams.

Figure 21A:
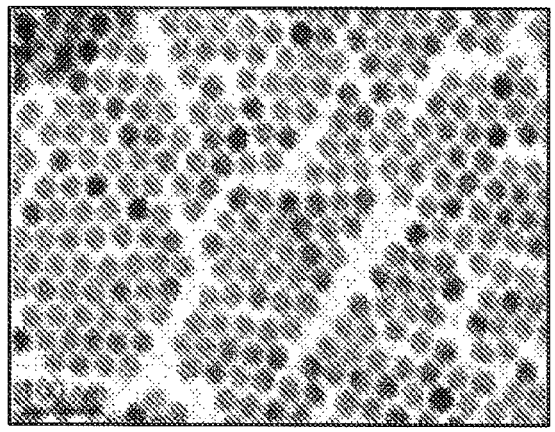
FIGS. 21A-21C show three different crystalline rare earth phosphors with very similar compositions that display similar spectral profiles when excited with infrared light.
Figure 21B:
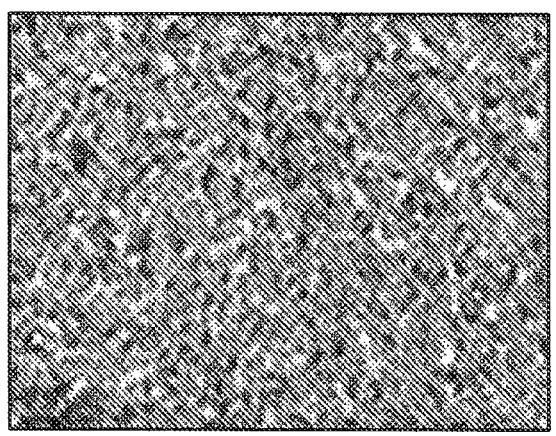
Figure 21C:
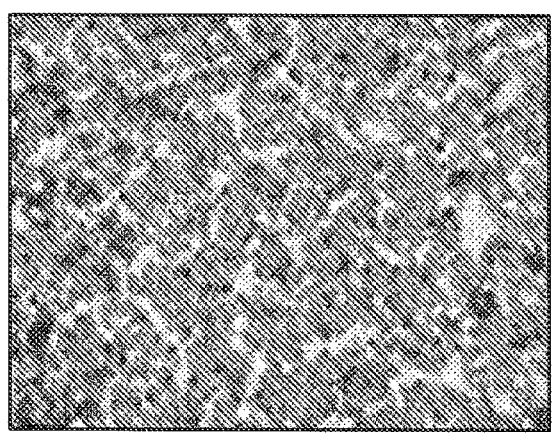
Figure 21D:
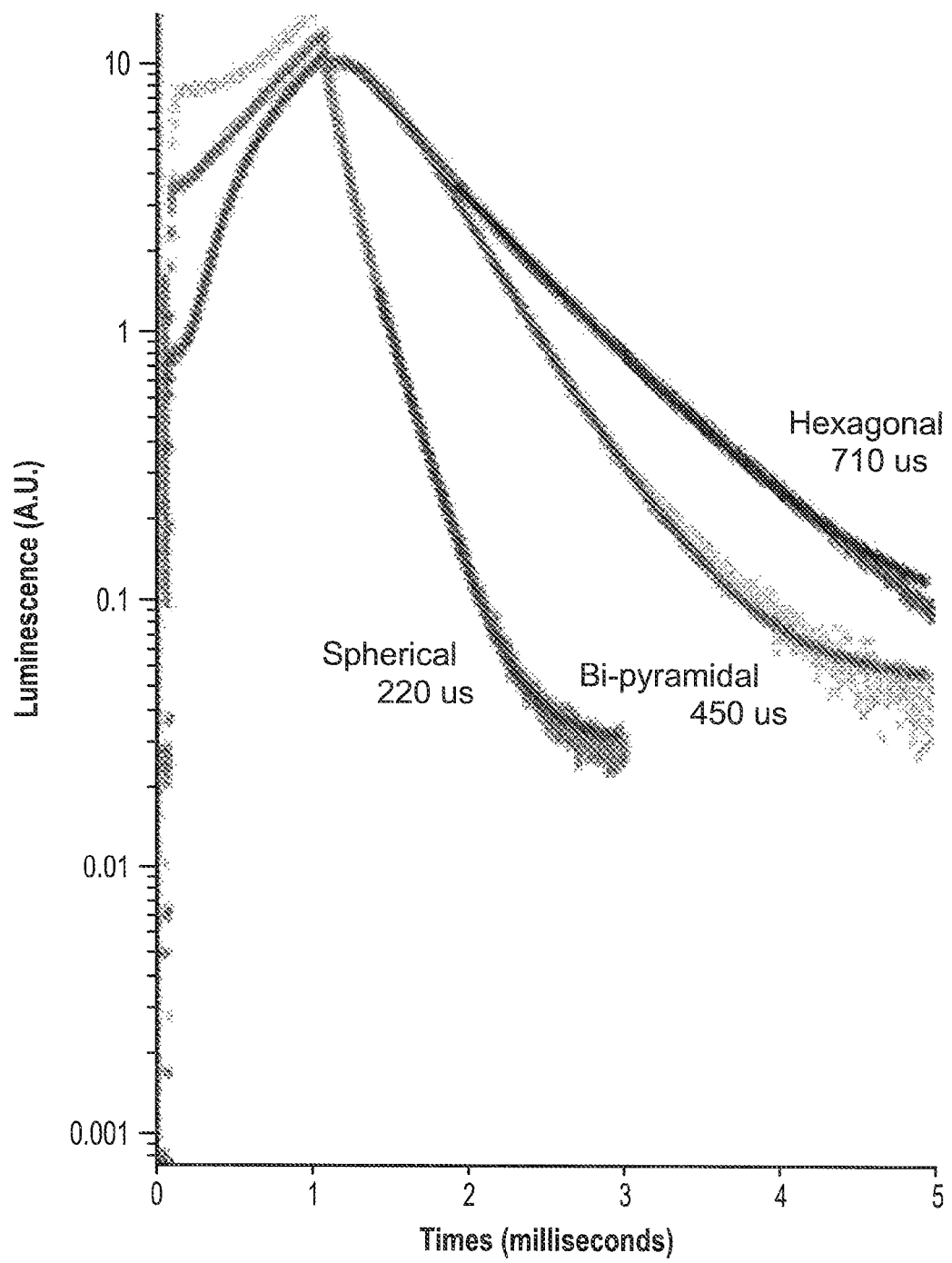
FIG. 21D shows the different temporal properties of the crystalline rare earth phosphors in FIGS. 21A-C based on morphology.

Downconverting materials convert higher energy photons (such as ultraviolet or x-ray radiation) to lower energy photons, such as visible light. The electromagnetic radiation emitted by downconverting materials is termed "fluorescence." Upconversion refers to materials that convert lower energy photons (lower frequency, longer wavelength) into higher energy photons (higher frequency, shorter wavelength). Yttrium Oxide crystals doped with Ytterbium and Erbium is an example of an upconverting material. These crystals absorb 1550 nm light (longer wavelength, lower energy) and converts it to a shorter wavelength, higher energy 980 nm light as well as visible emissions at 540 nm and 660 nm. The crystals also have unique temporal properties. For example, the amount of time it takes the crystal to "light up" (the rise time) and the amount of time it takes to turn off (the decay time) can be precisely controlled and depends on the host, do pants, shape and size of the crystals. Crystals with very similar compositions but different shapes will perform differently under pulsed infrared light. For example, FIGS. 21A-21C shows three different crystals with very similar compositions. When these crystals are excited with infrared light they all display almost identical spectral profiles, however the temporal properties of the crystals will vary based on morphology as shown in FIG. 21D. Each morphology will have its own surface area to volume ratio, which results in phonon energy changes and ultimately the temporal properties of the crystals. The lifetime of a particular energy level can be described as the sum of radiative and non-radiative emissions thus different morphologies will have unique rise and/or decay times. See also U.S. Pat. No. 9,181,477, which is incorporated by reference in its entirety.

Different crystalline rare earth phosphors behave differently under pulsed infrared light and can be distinguished based on the time rise property and time decay property of the crystal(s). Combining multiple Y2O3:YbEr crystals with different decay times allows for multiplexing of information, which allows vehicles sensing the crystals (via the intelligent paint) to identify various objects and to take various actions.

Rare Earth Phosphors

In certain oxide compositions, the presence of specific lanthanide-family ions in the lattice results in both upconversion (UC) and downconversion (DC) of incident radiation. While the UC process usually converts near infrared (NIR) or infrared light to higher energies, DC converts higher-energy photons into lower-energy photons. The DC resulting from NIR luminescence has attracted considerable attention for applications in solar cells that make use of DC-modification of incident light.

Figure 12:
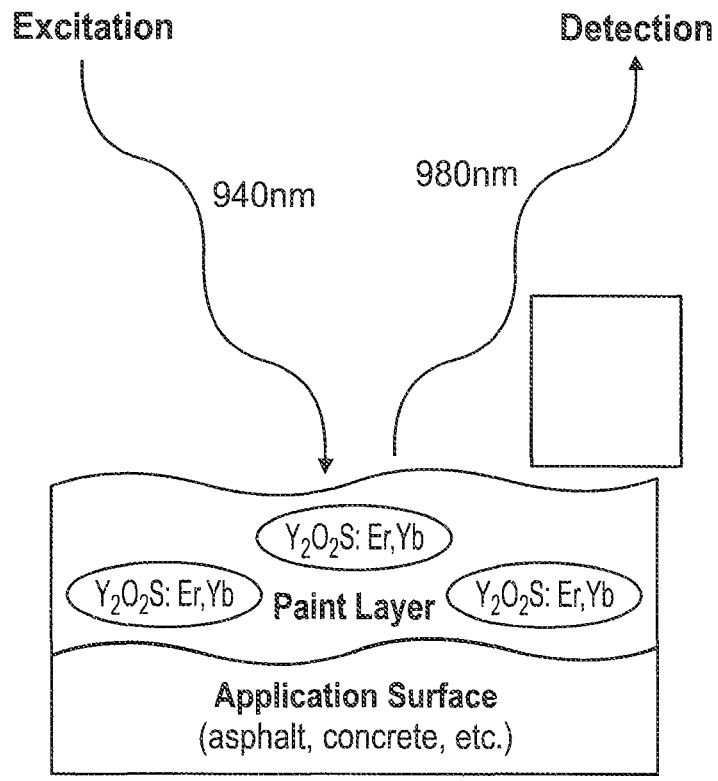

As outlined above, down-conversion occurs when a material is photo-excited by a shorter wavelength to result in multiple photo-emissions at a longer wavelength. FIG. 12 shows an example interaction of light with intelligent paint of the invention where the intelligent paint includes $Y_2O_2S$:Er,Yb particles. The example interaction of FIG. 12 shows a down conversion and phosphorescence emission from the intelligent paint, where an excitation at 940 nm results in detection at 980 nm. When an energy level has an adjacent lower energy level, the higher energy level will decay to the lower level through the emission of phonons/crystal lattice vibrations as in FIG. 12. Essentially, two or more low energy photons can be emitted for each high energy photon absorbed. In the invention, the main absorption bands lie between 900 and 1050 nm ($Yb^{3+}$ transition $^2F_{7/2} \rightarrow ^2F_{5/2}$), characteristic of $Yb^{3+}$—activated materials. The presence of the $Yb^{3+}$ ion allows for the absorption of incoming 940 nm light followed by downconversion. As a result, for specific excitation wavelengths, these compositions have quantum efficiencies exceeding 200%.

Optical Transitions of the Rare Earth Phosphor Embedded Road Paint

Figure 13:
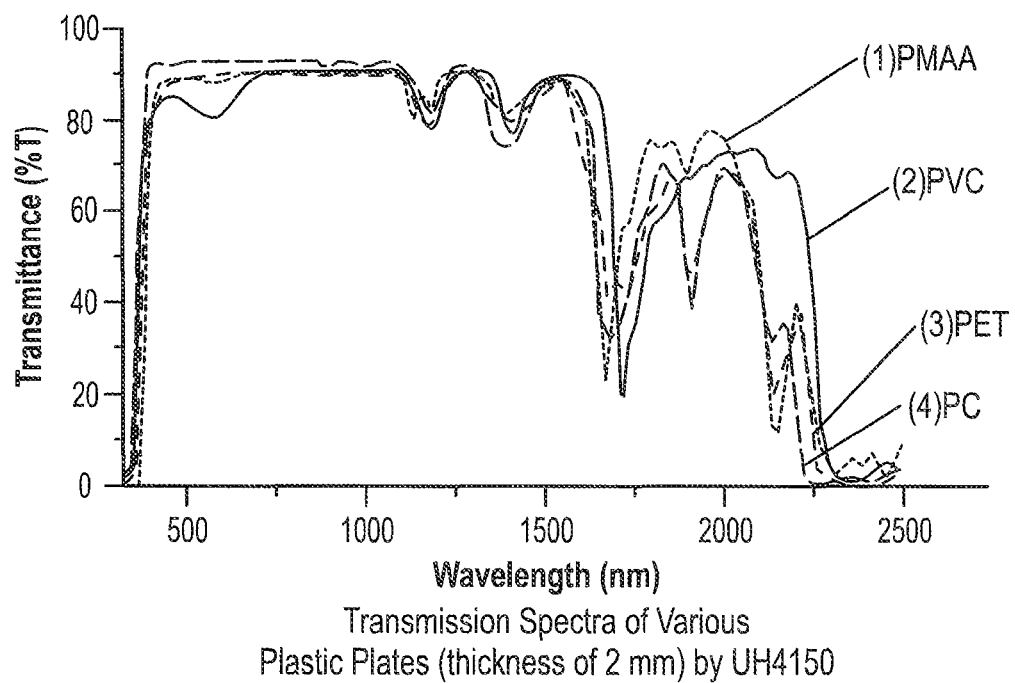

The compositions and rare earth do pants used in the intelligent paint of the invention were engineered to maximize the near infrared (NIR) optical conversion efficiencies, specifically conversion of 940 nm (excitation) to 980 nm (emission). FIG. 13 shows that NIR optical transitions are ideal because nearly all potential binder compositions (i.e., acrylates and other polymer resins) including those used in road paint have excellent NIR transmission properties, typically>85%.

Figure 14:
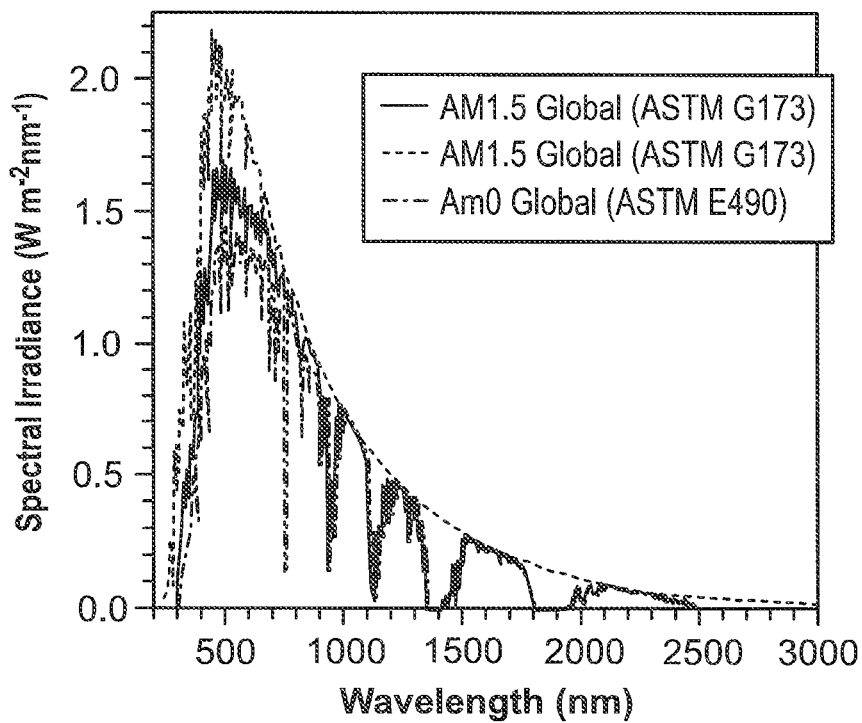
Figure 15:
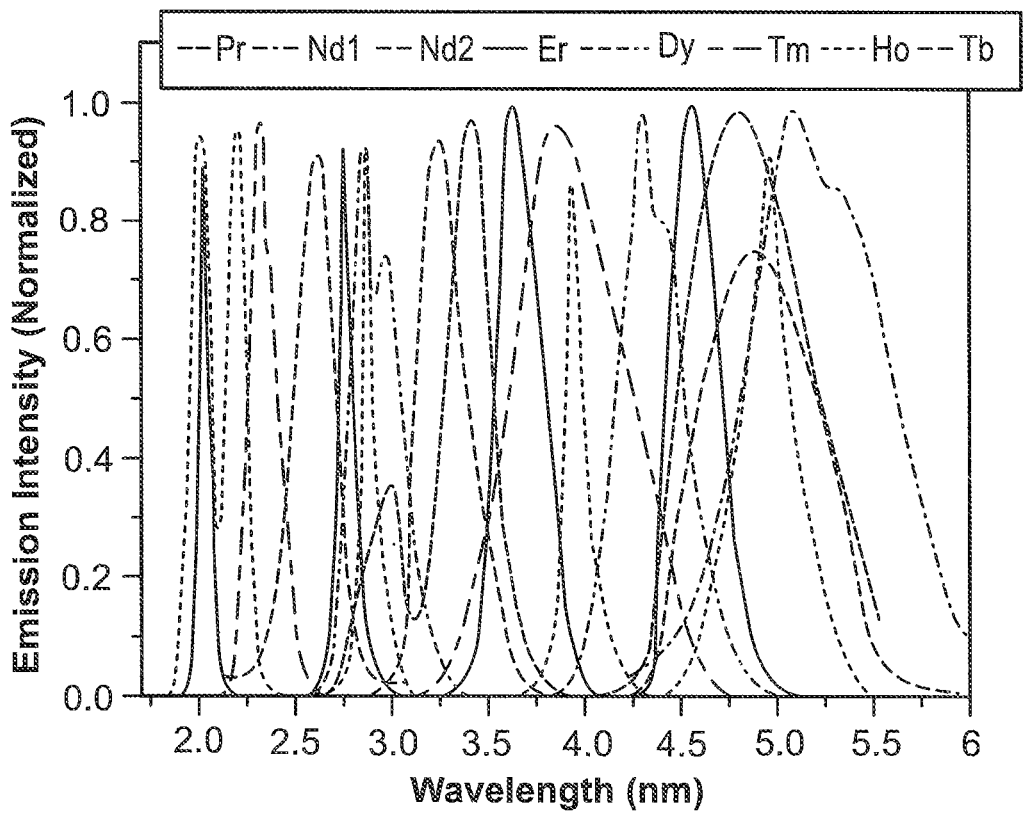

The compositions and rare earth dopants used for the first intelligent paint were engineered to maximize the near infrared (NIR) optical conversion efficiencies of the material, specifically conversion of either ~goo nm or 940 nm (excitation) to 860 nm and/or 980 nm (emission). The NIR optical transitions were selected because nearly all thermoplastic compositions (e.g., acrylates and other polymer resins) used in road paint have excellent visible to NIR transmission properties, with most exceeding 85% transmission, as shown in FIG. 13. Additionally, as shown in FIG. 14, the NIR optical transitions were selected because solar radiation has several optical windows residing in the NIR (~9S0 nm-1000 nm). These windows coincide with the optical inputs and outputs of the intelligent paint of the invention. In one embodiment, the prototype sensor utilizes the MR window seen in the solar irradiation spectrum below, other sensor designs and intelligent paint compositions utilize materials with emissions residing in the short-wave infrared (SWIR) between 1.3-2.0 um and further into the Mid-Infrared up to 6 um as shown in FIG. 15.

Figure 16A:
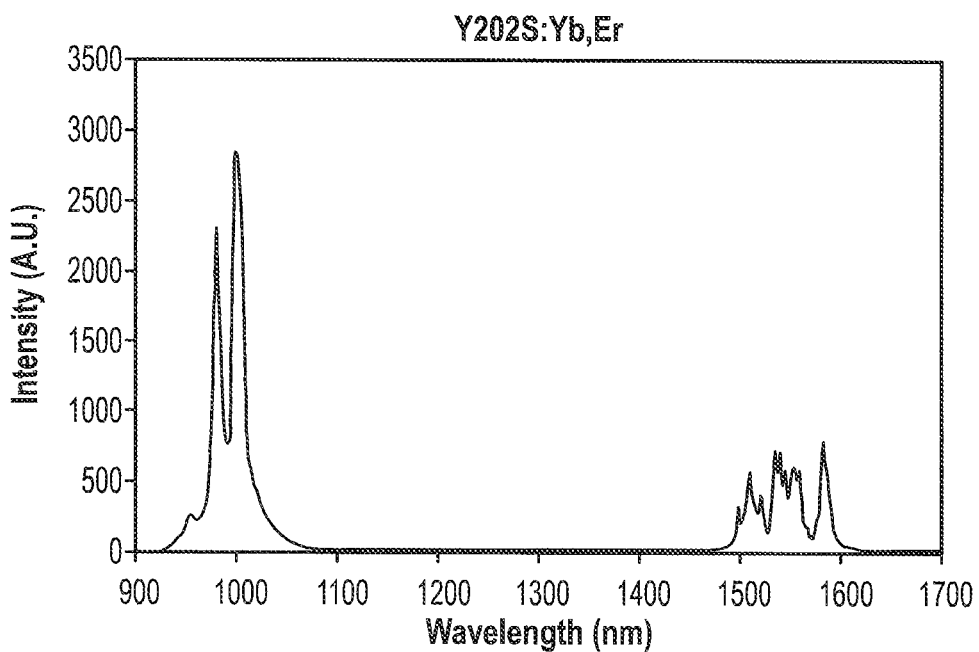
FIGS. 16A-16C show respective spectra of several rare earth doped phosphor compositions blended into standard thermoplastic paints.
Figure 16B:
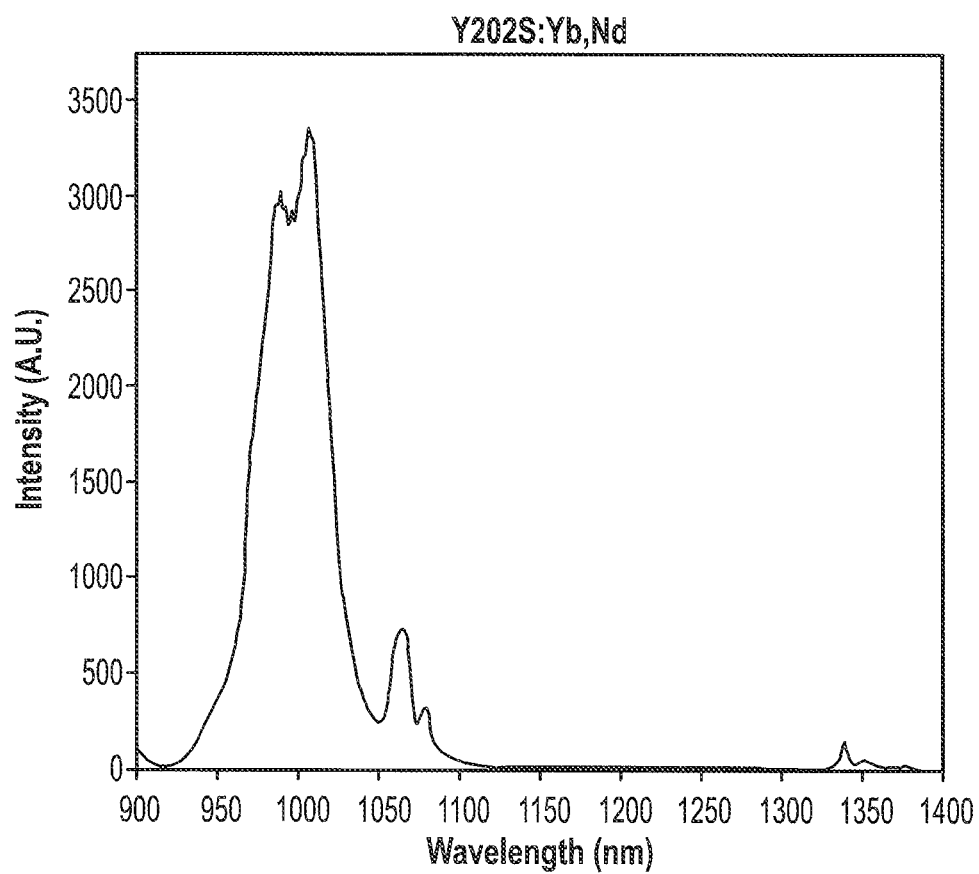
Figure 16C:
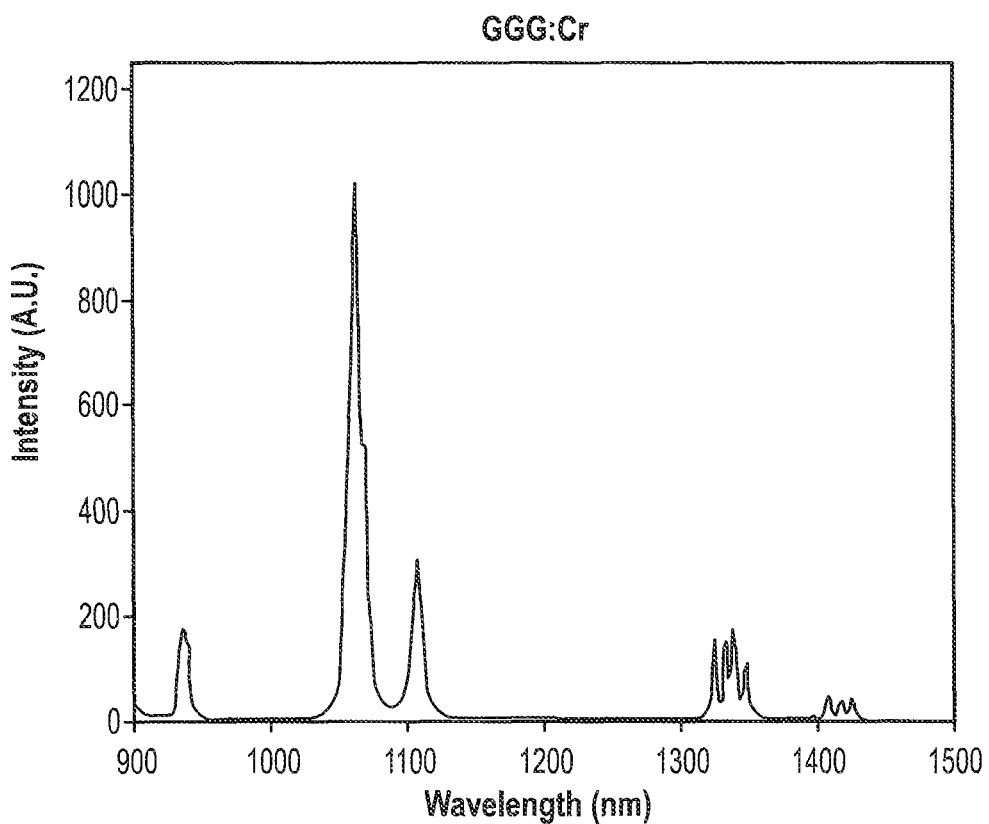

The presence of the multitude of electron transitions of the rare earths can provide many discrete excitation regions as well as both up and down-converted emissions in a single composition. Additionally, several rare earth doped phosphor compositions were blended into standard thermoplastic paints and their optical properties measured. Examples of these materials and respective spectra are shown in FIGS. 16A-16C. For example, FIG. 16A shows Yttrium oxysulfide doped with Ytterbium, Erbium excited using 808 nm CW laser. FIG. 16B shows Yttrium oxysulfide doped with Nd, Yb, and Tm excited using 808 nm CW laser, and FIG. 16C shows GGG (Gadolinium Gallium Garnet) doped with Cr excited using 808 nm CW laser.

Figure 17:
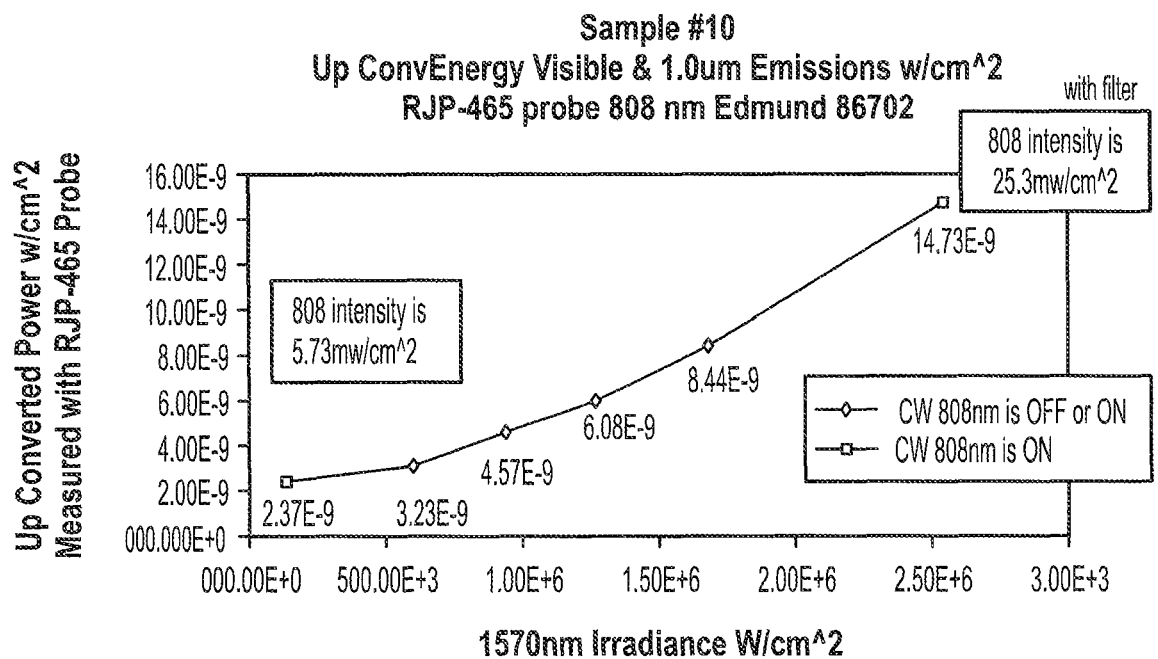
Figure 18:
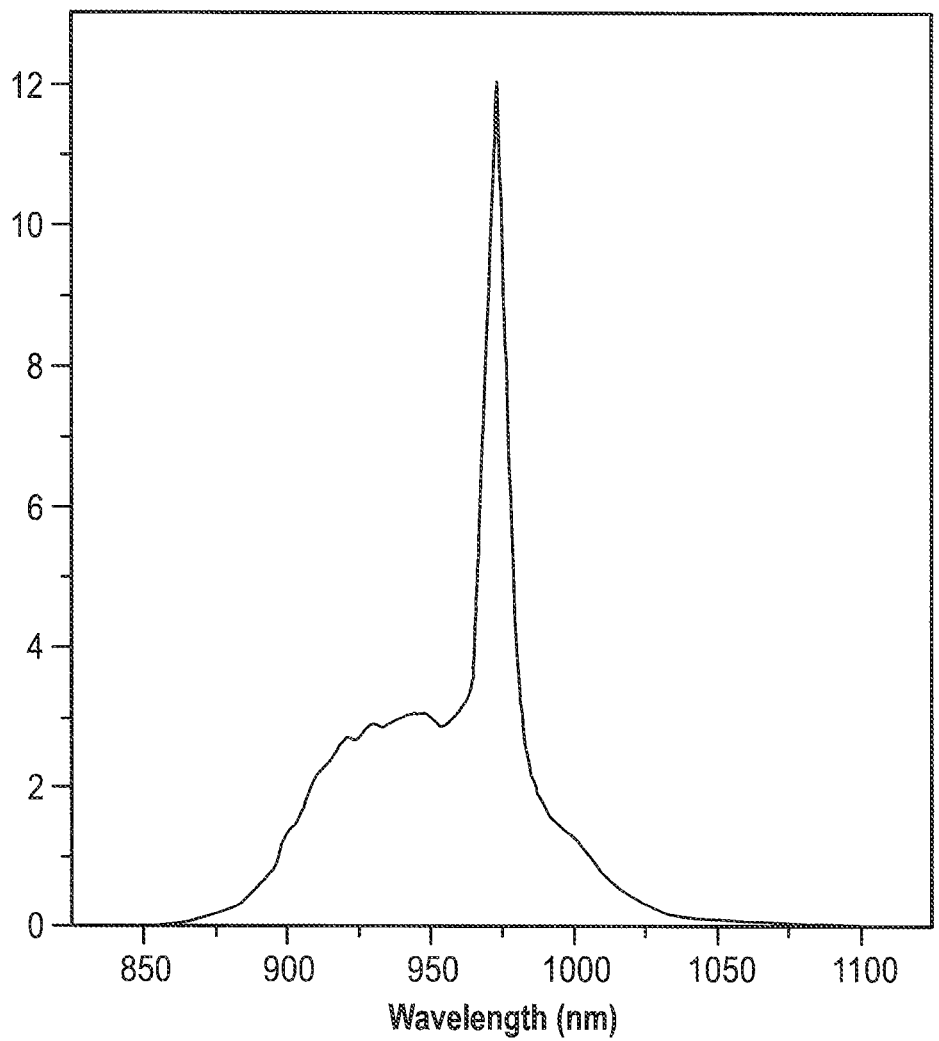

Another composition used in the invention, $Y_2O_2S:Yb,Er$ can possess multiple excitation and emission transitions both up and down-converting. The example in FIG. 17 shows the power density dependence for the upconversion process when excited using 1.570 um lasers and measuring intensity of both visible and NIR upconverted emissions. FIG. 18 depicts the NIR upconverted emission of the $Y_2O_2S:Yb,Er$ excited at 1.570 um.

Figure 19:
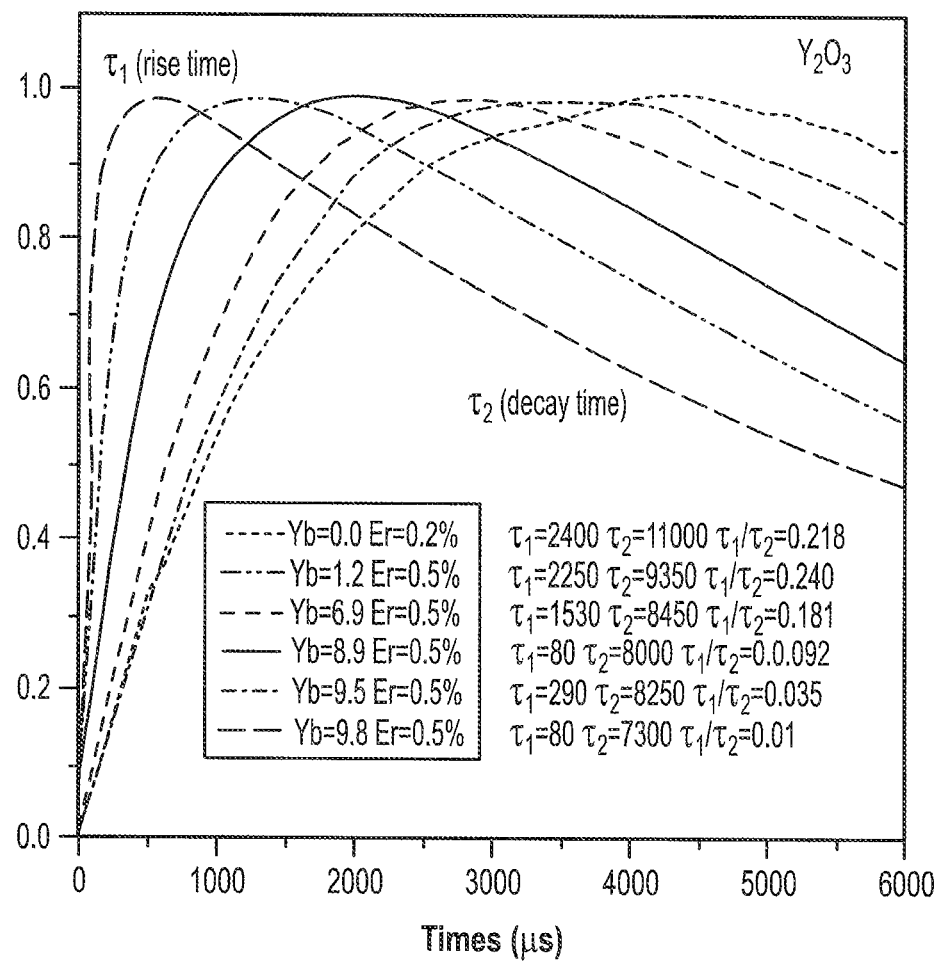

One method of detection of this material utilizes both the specific optical transitions and the tunable lifetime (rise and decay) properties of these materials. By changing host lattice or dopant concentrations and/or ratios, it is possible to specifically control the rate at which these materials absorb and release photons. This rate can be precisely measured allowing for reduced electronic and optical noise that can be introduced into the system. For example, FIG. 19 shows the lifetime tunability of Yb,Er doped phosphor excited using 980 nm and lifetime measurements recorded at 1540 nm, that is the tunable lifetime by adjusting Yb to Er ratios.

Generally speaking, if an energy level has an adjacent lower energy level, the higher energy level will decay to the lower level through the emission of phonons/crystal lattice vibrations. This lifetime principle is described by first-order kinetics as the exponential decay of excited state populations after turning off the excitation pulse following the simple decay law:

$$I(t)=I_0 \exp(-t/\tau) \quad (1)$$

In which for a single exponential decay I(t)=time dependent intensity, $I_0$=the intensity (or amplitude) at time 0, and $\tau$=the average time (or $<t>$) a phosphor (or fluorophor) remains in the excited state equivalent to the lifetime.

$\tau$ is the inverse of the total decay rate:

$$\tau=(T+k_{nr})-1 \quad (2)$$

Where at time t following excitation, T is the emissive rate and $k_{nr}$ the non-radiative decay rate. In general, the inverse of the lifetime is the sum of the rates that depopulate the excited state. The luminescence lifetime can be simply determined from the slope of the plot of ln I(t) versus t that equals 1/τ. It can also be the time necessary for the intensity to decrease to l/e of its original value (at time 0).

Figure 20A:
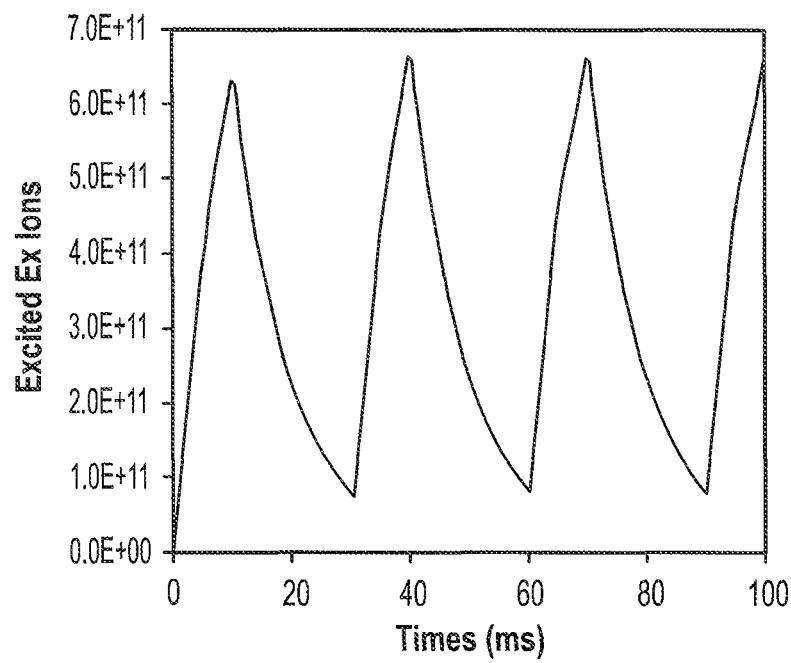
FIGS. 20A and 20B show calculated versus actual measured lifetime emissions of a rare earth phosphor of the invention based on frequency domain calculations.
Figure 20B:
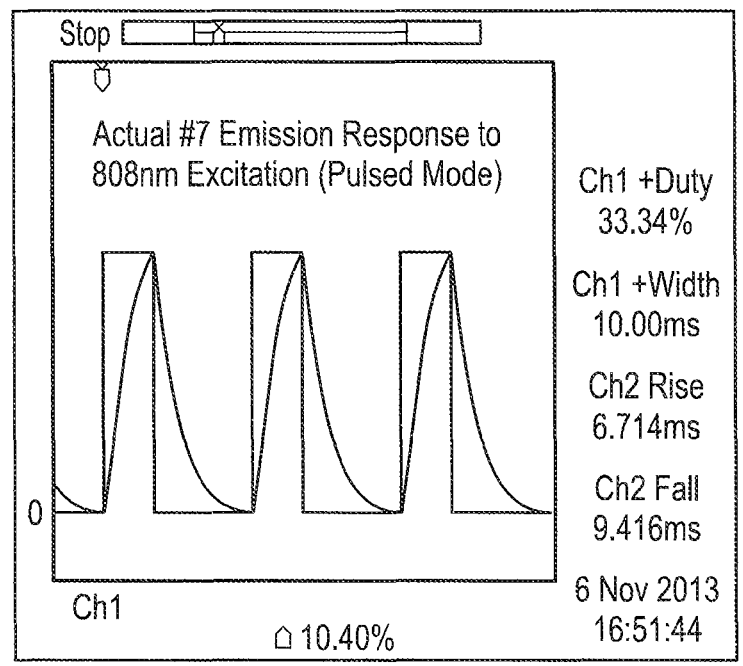

The sensor of the invention utilizes frequency-domain (FD) and phase-modulation methods for lifetime discrimination of the materials, in which excitation light is both intensity modulated and at variable high frequencies. The emission responds at the same modulation frequency causes the lifetime to be delayed relative to the excitation. This delay is measured as a phase shift. The system can incorporate this method to discriminate the phosphorescence "rise times" that are difficult to detect in the time-domain of the pec timescale. Rise times displayed by the phosphors provide a unique spectral feature not found for the vast majority of known, luminescent species. For most, the emission occurs from the initially excited state and begins to decay immediately. For the phosphors, there is a time delay while the emission state is populated, which is the rise time. This rise time can result in a unique frequency domain observation, a phase angle>90 degrees. If the rise times of the phosphors do not depend significantly on excitation intensity then the rise times can be used in the same way as the decay times. Typically, there is a lower parameter correlation when a rise time is present. FIG. 20A shows the calculated lifetime emissions of $Y_2O_2S:Yb,Er$ under 808 nm excitation, while FIG. 20B shows the actual measured lifetime emissions based on frequency domain calculations.

Cooperative-Vehicle Roadway Guidance

As outlined above, combining multiple crystalline rare earth phosphors, such as $Y_2O_3$:YbEr crystalline rare earth phosphors, with different decay times allows for multiplexing of information. The ability to multiplex optical signatures of the intelligent paint will enable greater interaction with the environment and improved situational awareness for the machine vision systems that currently guide most automated capable vehicles. Multiplexing will enable assignment of unique optical codes providing detailed environmental feedback from a variety of traffic signs and markings that will have a significant role in the decision-making process of automated vehicles and will become more pertinent as artificial intelligence and augmented reality technologies continue to grow in this space. For example, different lanes can have different crystalline rare earth phosphors that are designed to show the position of the vehicle. FIG. 19 shows Yb/Er variations in $Y_2O_3$ crystalline rare earth phosphors, synthesized by flame spray pyrolysis, yielding tunable optical properties. FIG. 19 depicts the tunable nature of the crystalline rare earth phosphors' temporal properties by minor ratio adjustments between Yb and Er. Synchronization of the laser and detector is such that the rise and decay emissions of the crystalline rare earth phosphors are measured by the detector on the "off" cycle of the laser during pulsing. Combinatorial sequencing of various crystalline rare earth phosphor compositions provide vehicle sensors with multiple parameters for detection, including power density dependence, absorptions, wavelength shift, peak ratios and temporal properties at multiple wavelengths, increasing the amount of information achievable. A vehicle on the roadways needs to be able to identify many different objects. CAMP (Collision Avoidance Metric Partnership) is a consortium of major vehicle manufacturers working on connected vehicles. The goal of the partnership is to ensure that every vehicle knows where every other vehicle is. It is inevitable that all vehicles eventually will be connected. A major limitation of current vehicle location systems is the heavy dependence on Global Positioning Satellites (GPS) to assist in vehicle navigation. This is due to the many environments or weather conditions where GPS is not available. In "urban canopies" the GPS signal is lost because of large buildings. GPS resolution is also inhibited in rural, densely forested areas due to lack of clear line of sight. In these instances, intelligent paint helps calibrate the vehicle(s) and predicts very precisely where the vehicle will be at any given moment. Multiplexing of intelligent paint also enables more locations for the intelligent paint to serve as calibration for GPS in denied environments.

In one example of the invention, when a vehicle approaches an intersection, it is currently difficult to measure the vehicle's position at an exact time. Intelligent paint applied at a distance before the intersection helps identify what lane the vehicle is in and how far away it is from the intersection. The longitude and latitude position is relayed to other cars and can be synchronized with the vehicles' GPS systems.

The invention provides systems and methods to reliably locate vehicles through cooperative systems in challenging highway environments, varied light conditions, bad weather, and long wear. An inexpensive sensor/processor is placed on vehicles and interacts with system markers in roadway paint and other markers. Different crystalline rare earth phosphors provide coding so that the vehicles recognize different compounds embedded in the roadway paint and other markers (e.g., signs, other vehicles, railroad crossings, landmarks, and the like) and so vehicles distinguish among a number of codes. The system then processes the codes, and the vehicle interprets the codes to obtain information keyed to the vehicle location and operation. Using this system, standard roadway markings provide intelligence that enables and facilitates vehicle control applications. The materials used in the invention possess high levels of tunability over the optical, magnetic, or radio frequency emissions spectra. The system uses crystalline rare earth phosphor materials designed to emit a unique optical, magnetic, or radio frequency signature and easily reads these spectral signatures using a sensor tuned to that particular material signature. For example, one material class utilizes the tunable optical properties of compositions designed to absorb and emit at specific wavelengths in the Visible-Far Infrared Spectrum (Vis, NIR, SWIR, MIR, FIR/LWIR). The crystalline rare earth phosphors are activated with visible and infrared light and produce distinct lines in the infrared region with a programmed time decay. A recent test with the National Air and Space Intelligence Center (NASIC) detected the infrared signature of a YGG:Cr crystalline rare earth phosphor in the daytime from a distance of greater than 11,000 feet using passive excitation (i.e., ambient light).

The concentration of crystalline rare earth phosphors in a paint composition or a marking material of the invention can range from a few parts per billion to approximately 20% loading by weight. The concentration may range form 1 ppm to approximately 15% loading or from 0.001% to approximately 10%, or from 0.1% to approximately 5%, or from 0.5% to approximately 3%. A 1% loading, for example, provides satisfactory results.

Using the materials and systems of the invention, vehicles recognize a location directly under (or ahead of or adjacent to) the subject vehicle so that the system reliably and timely determines vehicle location. A number of different roadway marks support this use as well as off-roadway signs, markers, and the like. The system can determine both lateral and longitudinal location.

Vehicles equipped with the invention successfully recognize standard highway paint/markings when the marking is encoded with the (crystalline rare earth phosphor) message material of the invention. The marking process of the invention conveys a general or specific meaning to support driver information or control applications technology. The markings can be located directly under or ahead or adjacent to the vehicle. Applicants measured accuracy, timeliness, distance, direction, and reliability of the recognition process of the invention.

For example, research, development, and demonstration tests to assess the intelligent paint technology of the invention confirmed reliable and timely identification of the passage of a vehicle at a marked location. The tests also confirmed the ability of the invention to differentiate between locations marked with different crystalline rare earth phosphors. Additionally, the tests confirmed the ability of the invention to identify roadway paint/markings by their purpose and location. Applications enabled by the cooperative technology provide important safety, mobility, and environmental benefits to the public.

U.S. Pat. No. 9,181,477 describes the crystalline rare earth phosphors, which can be used in the systems and methods of the invention. Other rare earth phosphors are described in U.S. Pat. Nos. 5,674,698; 6,039,894; 6,132,642; 6,159,686; and 6,379,584. Crystalline rare earth phosphors are available from Intelligent Material Systems, Inc., Princeton, N.J.

The materials used in the systems of the invention incorporate crystalline rare earth phosphors that exhibit unique optical properties in the electromagnetic spectrum. During manufacture, the morphologies of these crystalline rare earth phosphors are controlled, and in turn, temporal properties such as rise and decay times are controlled. The system incorporates a number of different techniques to extrapolate data from the crystalline rare earth phosphors. Devices of the invention are designed and manufactured to compensate for sunlight and other interference conditions.

Figure 11:
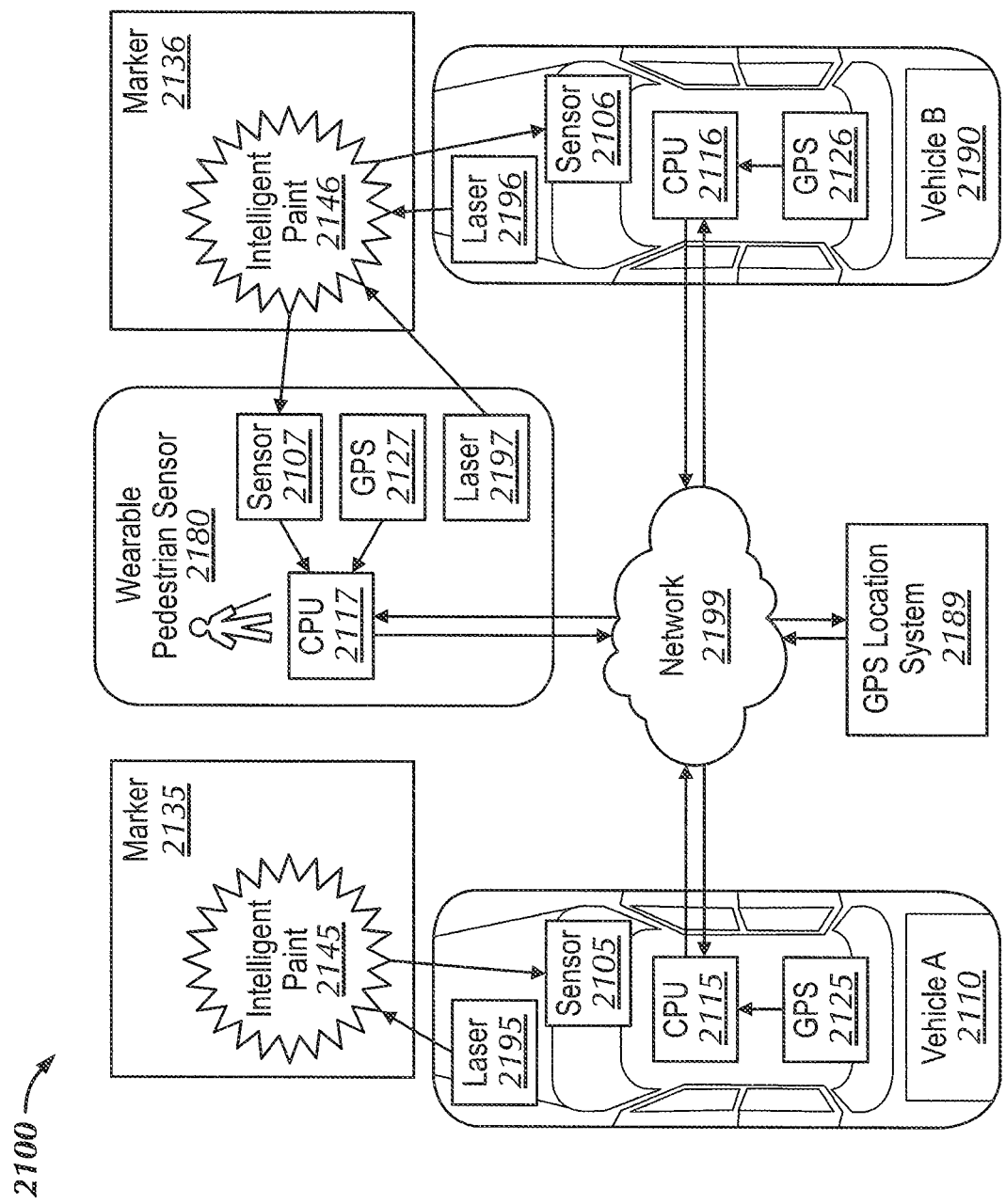

As shown in FIG. 11, one cooperative vehicle-highway communication system 2100 links multiple vehicles 2110, 2190 and pedestrians 2180 using a wearable pedestrian sensor 2107. For example, vehicle A 2110 is equipped with a laser (emitter) 2195, sensor (detector) 2105, CPU 2115, and GPS 2125. Vehicle B 2190 is similarly equipped with a laser 2196, sensor 2106, CPU 2116, and GPS 2126. Pedestrian 2180 wears or otherwise carries a laser 2197, sensor 2107, CPU 2117, and GPS 2127.

The system of the invention can use an integrated GPS device (i.e., integrated with a sensor and/or a vehicle and/or with a pedestrian device, such as a cane), or the system can use GPS devices and software available on smart phones and other portable GPS devices. Inertial measurement units (IMUs) can also be included in the systems of the invention to measure and report a specific force, angular rate, and magnetic field surrounding a vehicle, pedestrian, and other bodies using the invention. The IMUs can employ accelerometers, gyroscopes, and magnetometers to allow a GPS receiver to work when GPS signals are unavailable, such as in tunnels, under bridges, under an urban canopy, at airfields, in subways, and the like.

As vehicle A 2110 drives, laser 2195 excites crystalline rare earth phosphors in intelligent paint 2145 that serves as a marker 2135 on a roadway or similar surface. The excitation generates a phosphor emission from the intelligent paint 2145 that is detected by sensor 2105. The sensor 2105 passes the data to CPU 2115, which processes the sensor data. GPS 2125 recalibrates based on known GPS coordinates of the intelligent paint 2145. The CPU 2115 combines and calibrates the data and actively uploads the data to the network 2199, such as a cloud-based storage and retrieval synchronization system (not shown separately from network 2199). A similar process is conducted as vehicle B 2190 drives and as pedestrian 2180 walks and encounters intelligent paint 2147 in marker 2136. In both vehicle B 2190 and pedestrian 2180, the respective lasers 2196, 2197 excite crystalline rare earth phosphors in intelligent paint 2146 that serves as marker 2136 on a roadway, crosswalk, or similar surface. The excitation generates a phosphor emission from the intelligent paint 2146 that is detected by sensors 2106, 2107. The sensors 2106, 2107 pass data to CPUs 2116, 2117, which process the sensor data. GPSs 2126, 2127 recalibrate based on known GPS coordinates of the intelligent paint 2146. The CPUs 2116, 2117 combine and calibrate the data and actively upload the data to the network 2199. The cloud based storage and retrieval synchronization system shares the respective data as location information of the respective vehicles and pedestrian, enabling vehicle to vehicle communication and vehicle to pedestrian communication.

Figure 1:
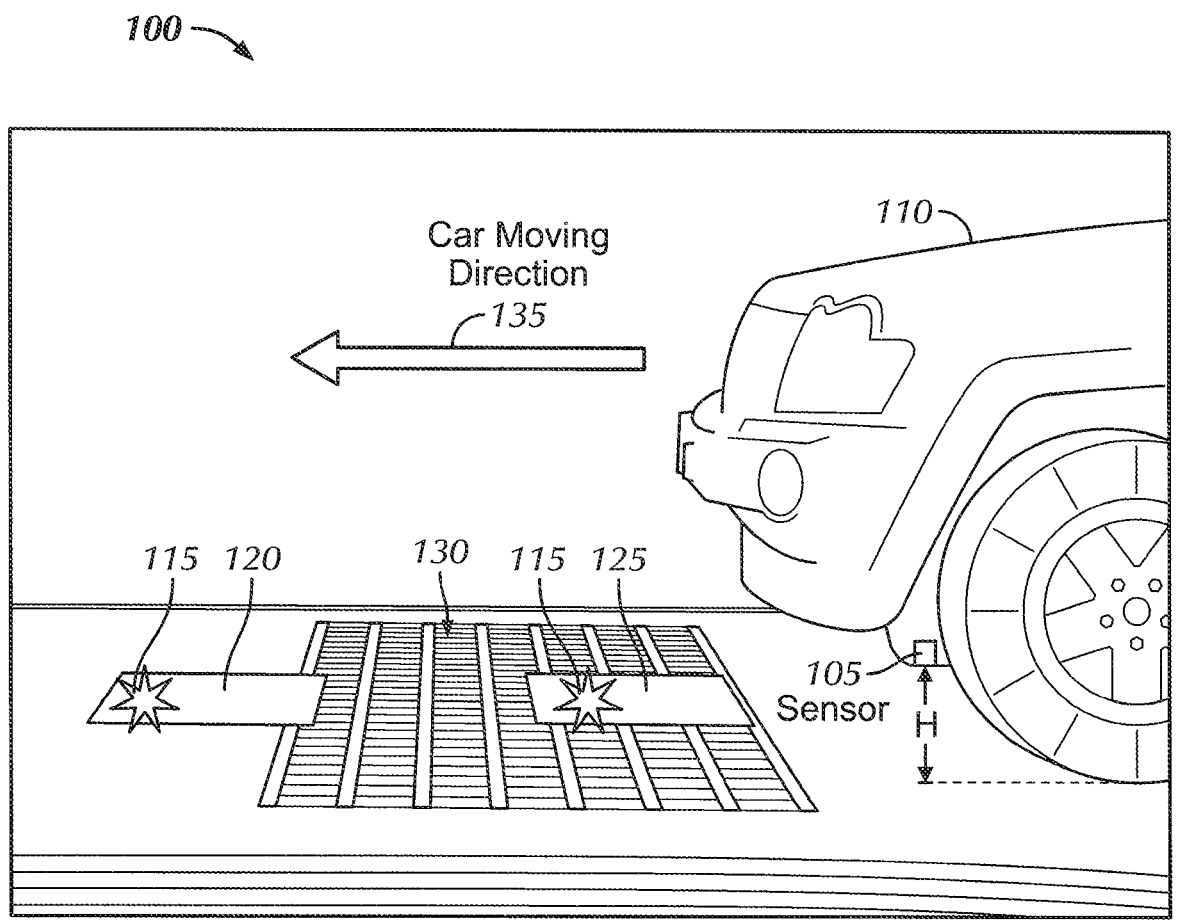
FIG. 1 shows an example cooperative guidance system to improve traffic safety and traffic efficiency in accordance with the invention.

FIG. 1 shows additional details of the system in operation. In an example system, one or more sensors 105 on a vehicle 110 read information from the crystalline rare earth phosphors 115 in the road markers/signs 120, 125. As outlined above, the crystalline rare earth phosphor road markers 120, 125 can be embedded and/or applied to the roadway surface 130 or can be used to supplement traditional roadway signs and markers. A processing unit (not shown separately) in the vehicle 110 processes information from sensor 105 from the crystalline rare earth phosphors 115 in the road markers 120, 125 and converts the received sensor information to position, speed, direction, and other positional and operational characteristics of the vehicle 105. The processing unit can be integrated with the sensors 105 or can be configured as a discrete component in or on the vehicle 110.

In one example implementation, the system 100 converts the spatial information provided by the markers 120, 125 through the sensors 105 through an inverse transformation in an image processing unit (not shown in FIG. 1) into a plane image. For example, the image processing unit identifies a pair of white guide lines (markers 120, 125) painted with the crystalline rare earth phosphors 115 along the travel path 135. The travel path 135 can also be a travel path side boundary, a center line, a cross walk, and the like. Regardless of the direction and orientation of the markers 120, 125, the sensor(s) 105 can be positioned and oriented to receive information from the markers 120, 125. The image processing unit then measures the length of the lines (markers 120,125) in relation to the vehicle 110. The sensing of the white lines (or other markers) on the travel path 135 enables the processing unit to calculate the spatial relationship between the vehicle 110 and the travel path 135. For example, the processing unit determines the distance of the vehicle 110 from a white line on the left and/or right side of the travel path, the angle between the forward direction of the vehicle and the travel path, and other geometric positional measurements, and the like. In the case of a curved travel path, the direction of the curve is determined as the vehicle traverses half the distance of the travel path. As another example, the system determines the distance of the vehicle from an intersection by detecting and measuring the intersection point of the white lines before the vehicle reaches the intersection.

Once the system determines the spatial relationship between the vehicle and the travel path, the processing unit provides the spatial information to a position unit (not shown in FIG. 1). The position unit includes speed and direction determination components, such as feedback from a speedometer or wheel speed sensors, for example. Similarly, the position unit can calculate the location of the vehicle in global coordinates. The sensors, processors, and position unit can be used as vehicle control components that provide input to other vehicle components and systems to supplement or initiate vehicle actions. For example, when the system sensors receive road marking information and determine that the vehicle is entering a turn, the vehicle control components can provide input to affect speed (e.g., gas pedal) and direction (e.g., steering wheel). Likewise, when the system sensors receive road marking information and determine that the vehicle is entering an intersection, the vehicle control components can provide input to affect speed (e.g., braking action) and location (e.g., stop at intersection stop line).

The crystalline rare earth phosphors in the roadway markers can be shaped and combined in different ways to provide different types of information. The different shapes and different combinations of crystalline rare earth phosphors provide different rise and decay properties that can be used to convey roadway and vehicle information. For example, white line lane markers can be painted with one combination of crystalline rare earth phosphors to provide lane information, while speed limit signs can be painted with a different combination of crystalline rare earth phosphors to affect speed and direction operation of the vehicle. Stop signs can be painted with yet another combination of crystalline rare earth phosphors so that when sensed, the information received by the sensors and processed by the vehicle control components can affect different operations of the vehicle (e.g., braking and stop position at an intersection). Orange construction barrels could be painted with yet another different combination of crystalline rare earth phosphors to provide further position and operation information to the vehicle.

The materials of the invention provide many possibilities to determine vehicle operations and to augment or to autonomously control a vehicle. The examples below detail the vehicle-to-intelligent-paint-communication and various ways intelligent paint can be applied to provide further situational awareness. The examples were conducted using an inexpensive sensor designed to look for the unique optical signatures from the intelligent paint with a high signal-to-noise ratio and high repeatability/reliability.

The invention also provides coating compositions containing crystalline rare earth phosphors. The coating compositions may be clear, opaque or colored. Coating compositions used for traffic marking on roads, highways, tarmacs, sidewalks and industrial flooring, etc. are examples of the coating compositions contemplated as are sealant or clear coat compositions. A coating composition of the invention comprises a resin binder with crystalline rare earth phosphors dispersed therein. As known in the art, the coating composition may a solvent based composition or a water-based composition depending on its particular use. Crystalline rare earth phosphors may be incorporated into coating compositions in the same manner as other pigments as is known in the art. U.S. Pat. No. 7,338,704, for example, discloses coating compositions containing florescent colorants. As another example, U.S. Pat. No. 8,298,441 describes water-based coating compositions contain phosphorescent pigments. Published PCT application WO 2007/056820 A1 also discloses luminescent latex paint compositions and their use in road marking. Other road marking compositions and procedures are described in U.S. Pat. Nos. 3,046,851, 3,136, 733, 3,321,329 and 3,474,057, which are incorporated by reference in their entirety.

Typical resins used in such coating compositions include, but are not limited to, crystalline rare earth phosphors of the invention can be added to paints and plastics to create intelligent paint compositions. Crystalline rare earth phosphors can be added to. acrylics such as poly methyl methacrylate (PMMA), acrylonitrile butadiene styrene (ABS), and non-acrylic thermoplastics such as Nulon, PLA, polybezimidazole, polycarbonate, polyether sulfone, polyetherether ketone, polyetherimide, polyethylene, polyethylene, polyphenylene oxide, polyphenylene sulfide, polypropylene, polystyrene, polyvinyl chloride, and Teflon.

Pigments and other additives known in the art to control coating rheology, surface properties or other coating properties can also be incorporated in a coating composition of the invention. For example a coating composition of the invention may further contain coating additives. Such coating additives include, but are not limited to, one or more leveling, rheology, and flow control agents such as silicones, fluorocarbons, or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; antiflooding and anti-floating agents; biocides, fungicides and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005. Further examples of such additives may be found in U.S. Pat. No. 5,371,148, incorporated herein by reference in their entirety.

Crystalline rare earth phosphors of the invention can be added to plastics to create intelligent markers that are applied directly to a surface such as a road, highway, tarmac, sidewalk, industrial flooring, etc. Crystalline rare earth phosphors can be added to standard roadway thermoplastics for positioning and guidance but also can act as reporters within the paint providing precise 'wear' and durability information by quantifying the emission intensity of the crystalline rare earth phosphors and correlating that to the paint stability. This feature can enable accurate timelines for re-application.

Another aspect of the invention is preformed thermoplastic pavement-marking materials containing crystalline rare-earth phosphors. Thermoplastic pavement-marking materials are preformed materials which are applied to a road surface, for example, with heating to adhere the material to the surface. These pavement/marking materials and methods for making and using them are known in the art. See, e.g., U.S. Pat. No. 9,133,318, which is incorporated by reference in its entirety. U.S. Pat. No. 9,133,318 and the other patents discussed therein describe the many and various thermoplastics that can be used and the many and various pavement-marking materials that can be made. Having a crystalline rare earth phosphor incorporated within a thermoplastic pavement/marking material allows that material to be used in a cooperative guidance system and method of the invention just as a paint or other coating composition is used to provide information to the system. In addition to providing information to a system of the invention, the crystalline rare-earth phosphors present in a given preformed material can be used to identify manufacturing and wear-and-tear information such as the source of the material, its date of application, and the degree of use since that date (e.g., loss of material due to traffic over the material).

EXAMPLES

Example 1: Vehicle Position Determination and Guidance

As outlined above, the system 100 depicted FIG. 1 includes two 20-inch sheets (markers 120, 125) printed with Fuji TM-clear ink with 2% Intelligent Material crystalline rare earth phosphors model N111 (crystalline rare earth phosphors 115), which is a composition of Y2O2S:Yb,Erp articles approximately 10 um in diameter. The sheets (markers 120, 125) were placed on the roadway surface 130 with a 20-inch separation between the sheets (markers 120, 125). The sensor unit 105 included pulsed 800 nm LEDs with gated silicon detectors matched to temporal properties of the crystalline rare earth phosphors 115 (crystalline rare earth phosphors model N111) and mounted under the car (vehicle 110) and pointed downward with a distance about ~8 inches (height H in FIG. 1) to the roadway surface 130. A 5V battery provided power to the sensor 105. The sensor 105 feeds a data acquisition card (not shown separately), controlled with a custom visual data acquisition and instrument control program (i.e., dataflow) that automatically collects and stores the sensor data. The visual data acquisition and instrument control program can be run on an integral computing device (to the vehicle) or on a physically separate computing device, such as a laptop computer inside the vehicle 105.

Figure 2:
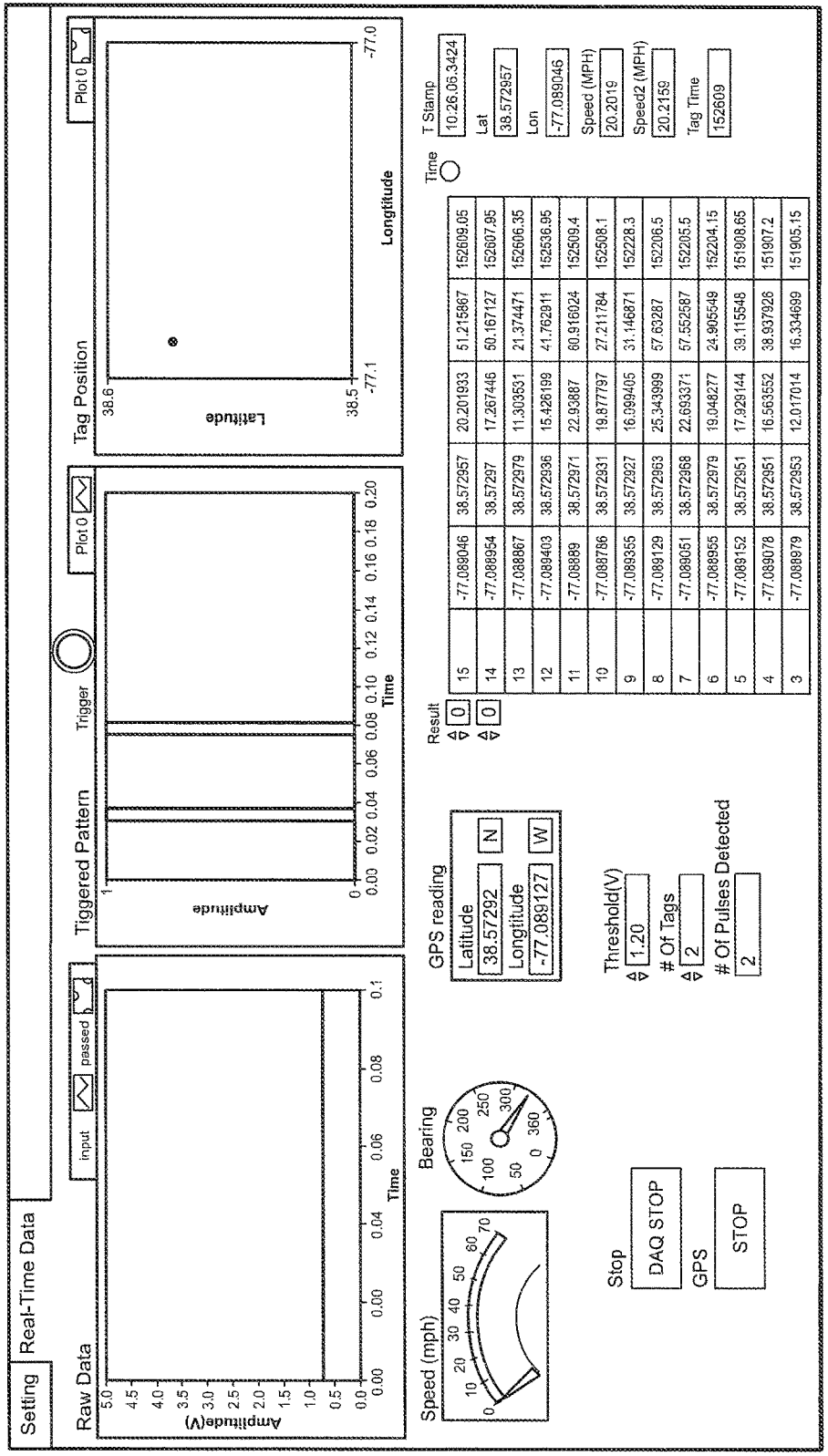
FIG. 2 shows a display of a user interface that tracks and displays performance of the system of FIG. 1.
Figure 3A:
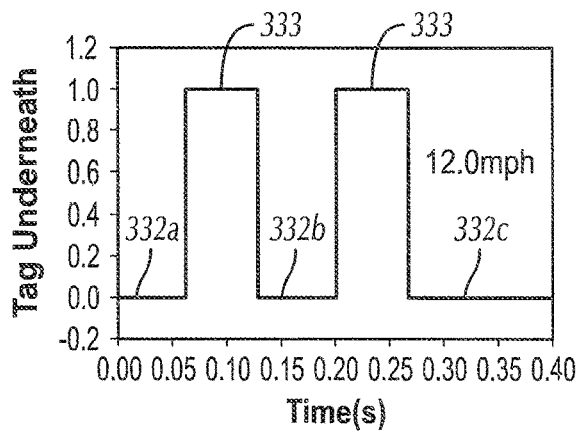
Figure 3D:
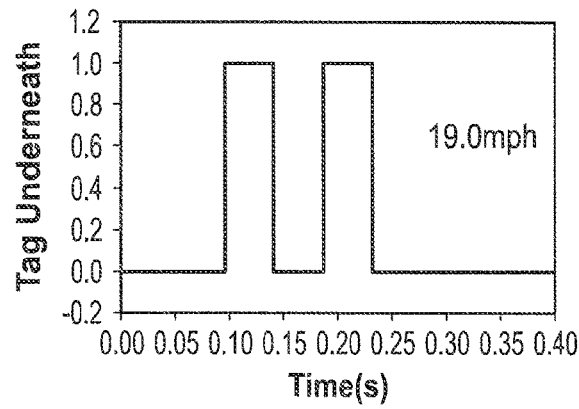
Figure 3B:
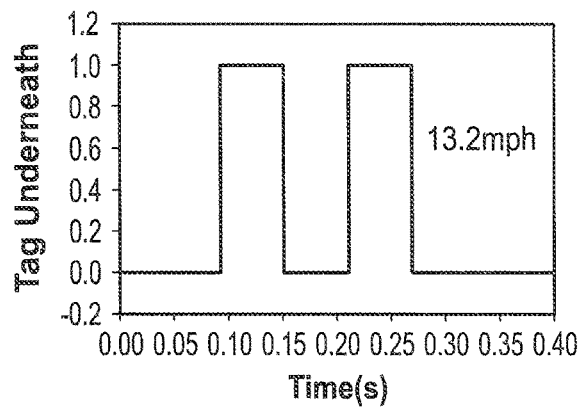
Figure 3E:
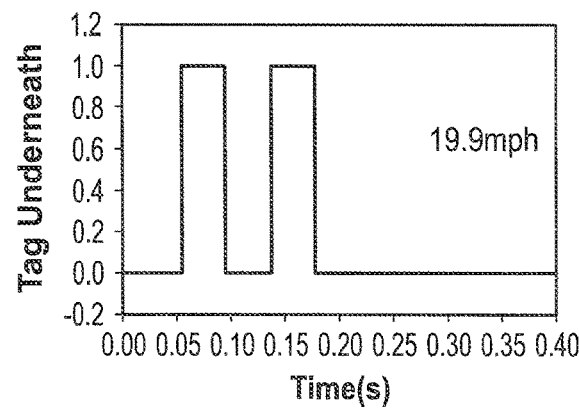
Figure 3C:
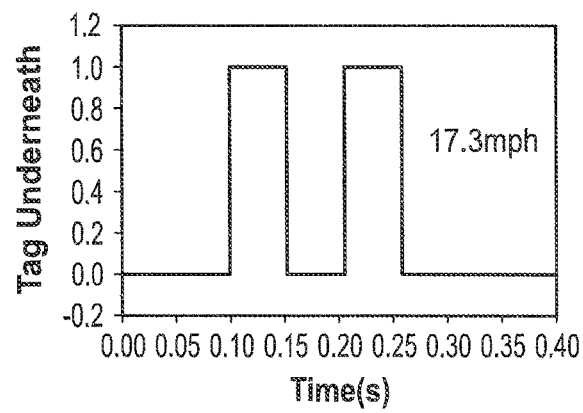
Figure 3F:
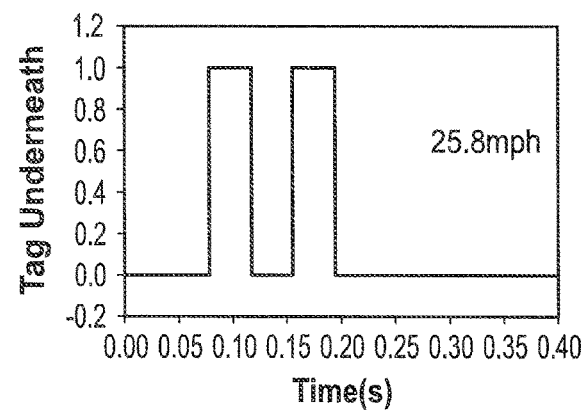
Figure 3G:
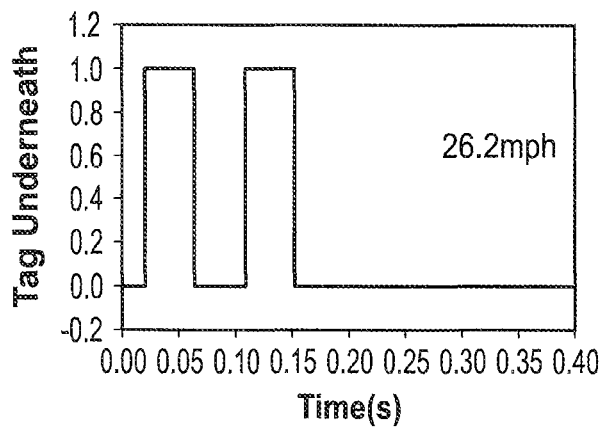
Figure 3H:
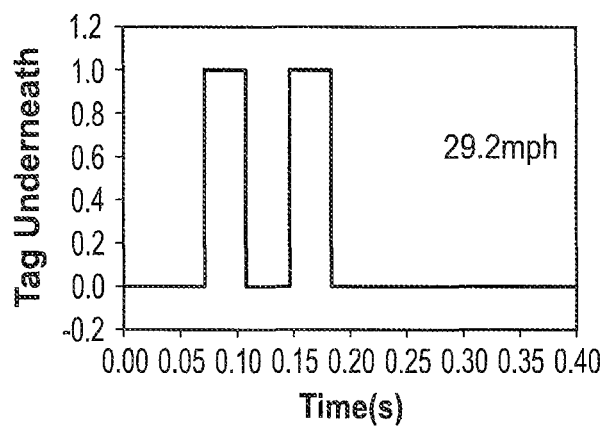
Figure 3I:
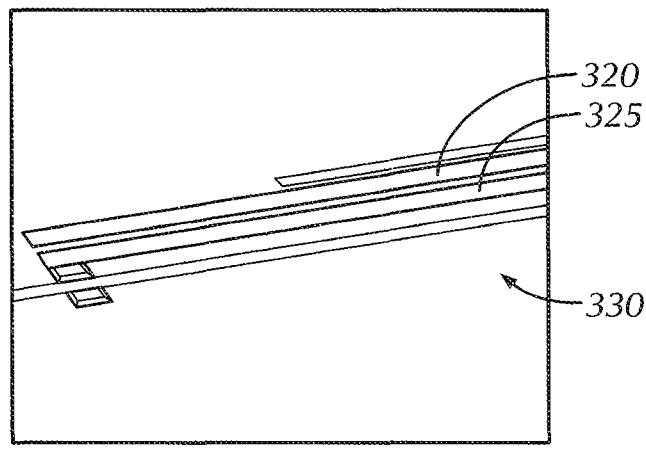

FIG. 2 shows an example graphical user interface to the visual data acquisition and instrument control program.

Figure 4A:
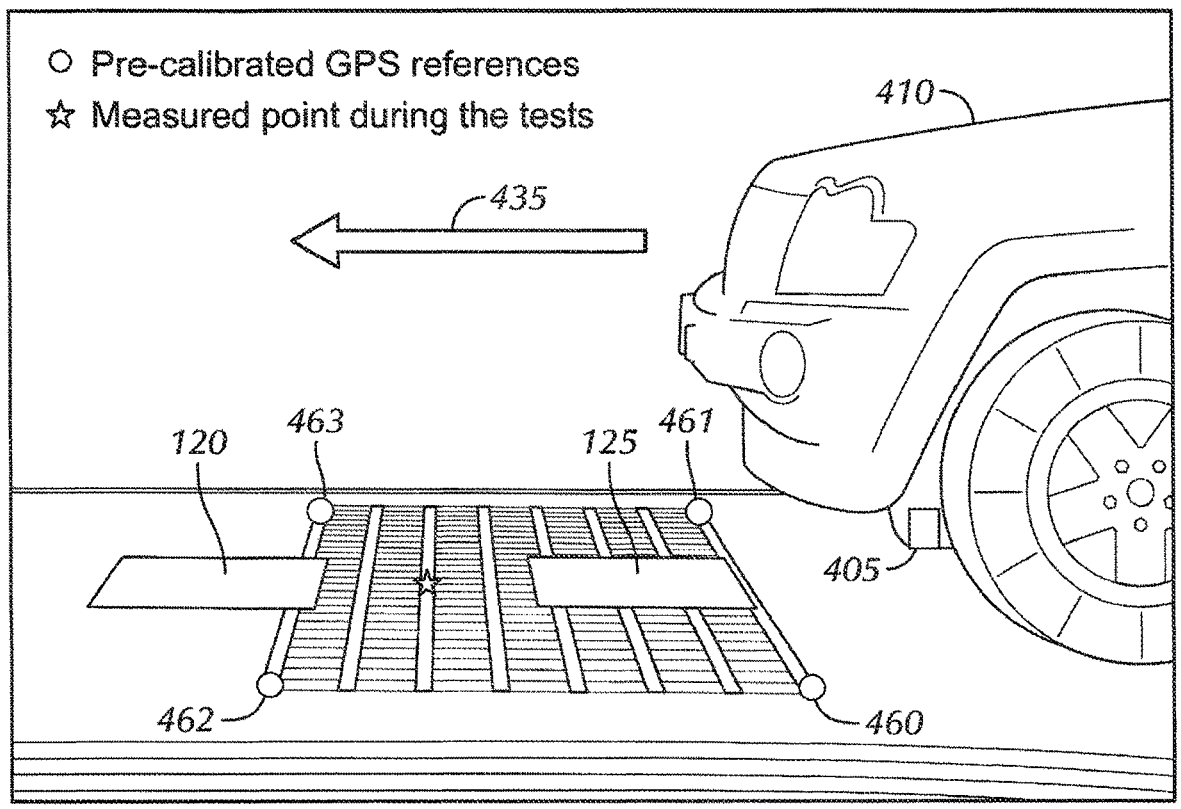
FIG. 4A illustrates an example vehicle-highway cooperative communications system with pre-calibrated global positioning satellite (GPS) locations and measured positions during operation of the system.

As shown in FIG. 4A, vehicle 410 drove in travel path 435 over the markers 420, 425. Thin stripes of intelligent paint (in the markers) were distinguished at various speeds. As the vehicle 410 passed over the markers 420, 425, the sensor 405 received a high signal 333 when it was on top of the markers 420,425 and received a minimal signal 332a, 332b, 332c when on roadway surface 430 without the markers. See FIGS. 3A-3H as discussed below.

FIG. 2 shows the trigger pattern 222 of the crystalline rare earth phosphors 115 in the intelligent paint markers 120, 125. The sensor signal was digitized at a sample rate of 200k samples/second. To compare the measured readings of the sensor to known locations, the vehicle 110 also incorporated a small GPS module with a MTK 3339 chipset to provide GPS information at 10 Hz. FIG. 4A shows the pre-calibrated GPS points of comparison 460, 461, 462, 463 for the markers 120, 125, and FIG. 31 shows an additional view of the roadway surface 330 with markers 320, 325. FIG. 2 shows the logged GPS data 244 for the measured readings.

Figure 4B:
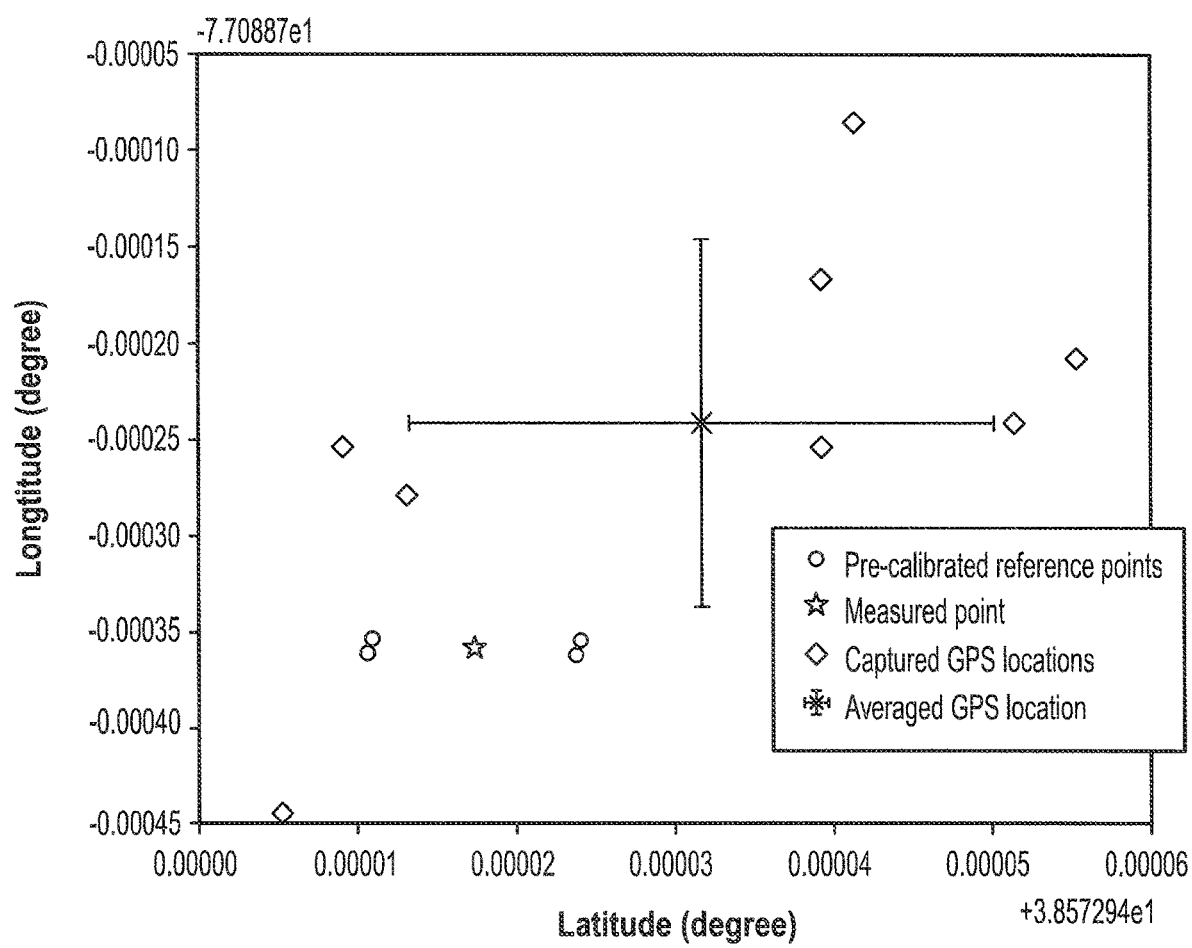
FIG. 4B shows a comparison plot of the pre-calibrated GPS locations and the measured location point using an example vehicle-highway communications system of FIG. 4A.
Figure 5A:
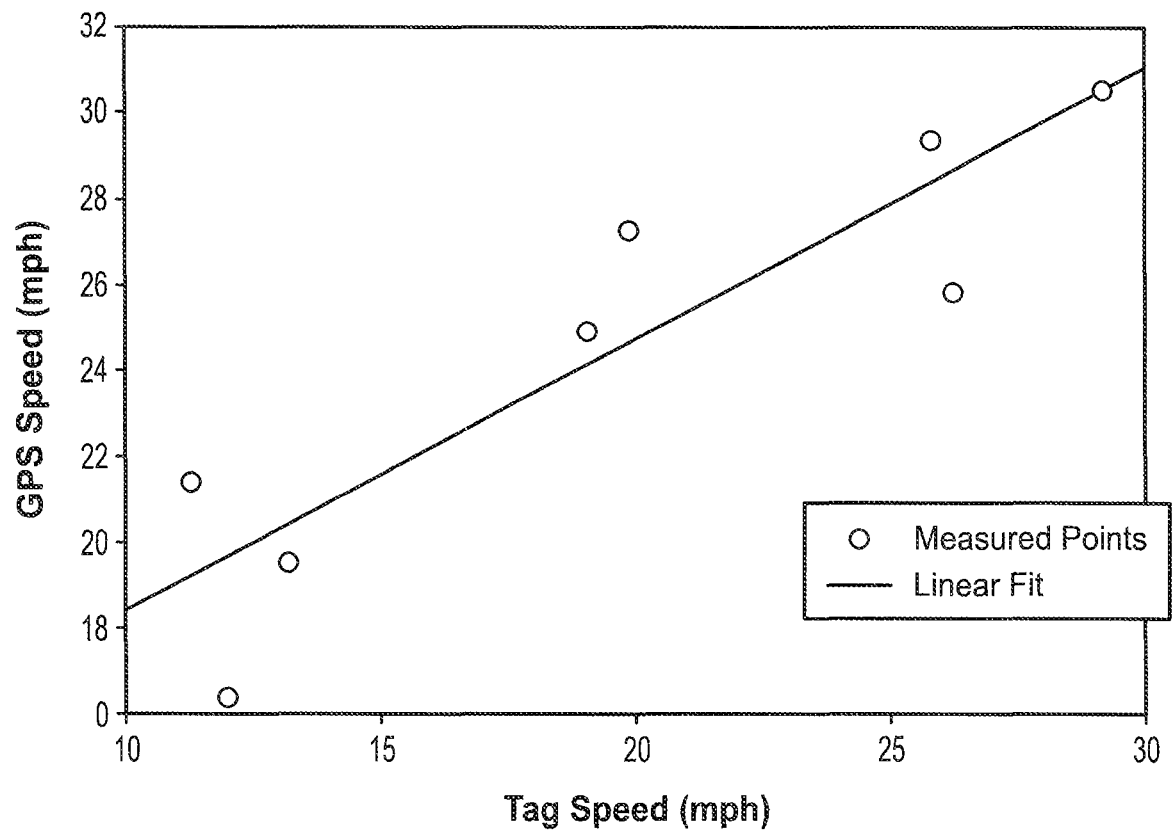
FIG. 5A shows a comparison of vehicle speed calculated with a tag versus vehicle speed measured using pre-calibrated GPS locations in an example vehicle-highway cooperative communications system of the invention.
Figure 5B:
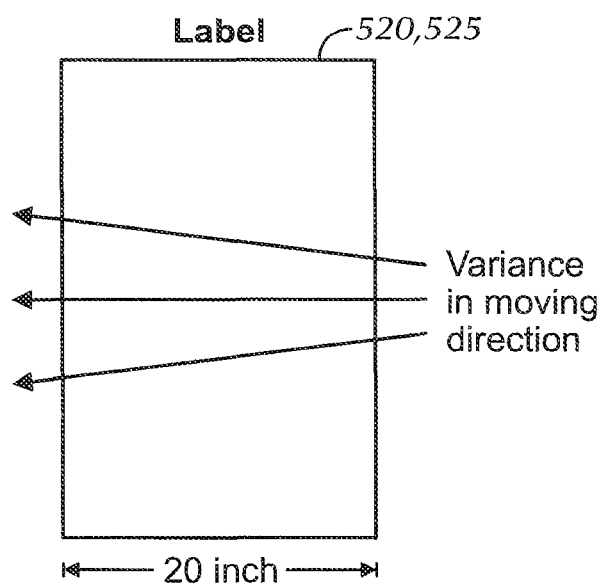
FIG. 5B is a diagram showing variance in measured speed based on travel time of a sensor on a label and the width of the label in an example vehicle-highway cooperative communications system of the invention.
Figure 6A:
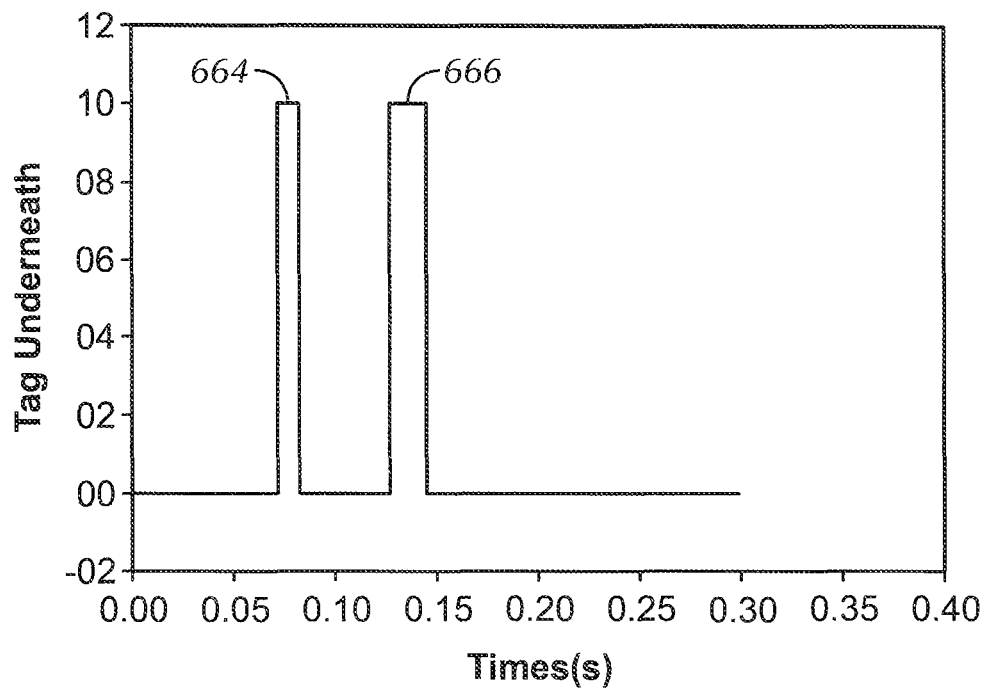
FIGS. 6A-6F show times and positions of tags using different width strips to measure and provide calibration of GPS coordinates in an example vehicle-highway cooperative communications system of the invention.
Figure 6B:
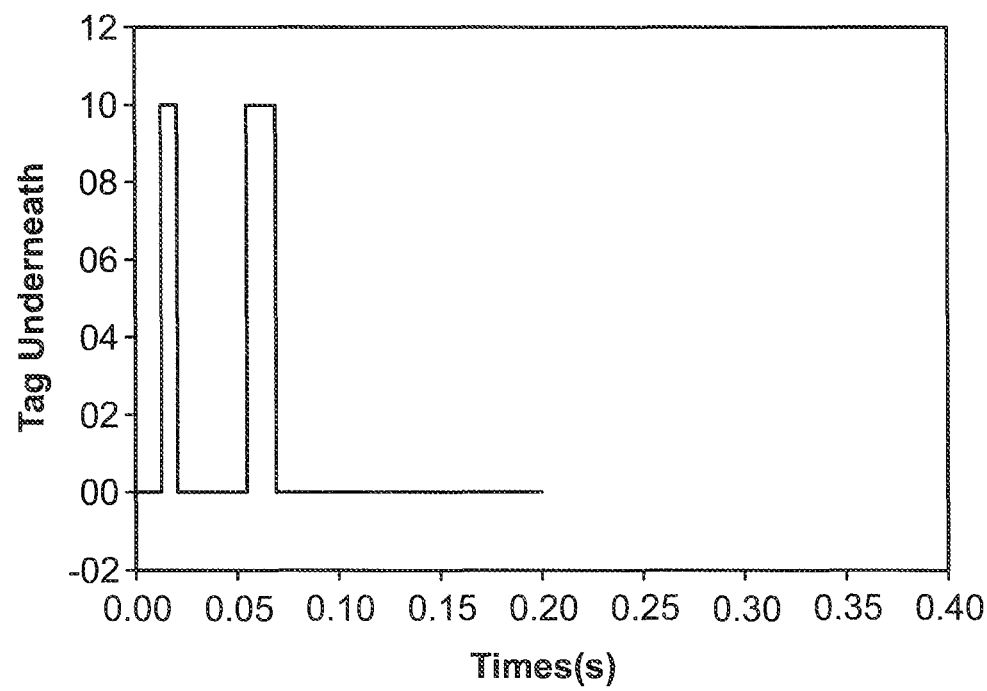
Figure 6C:
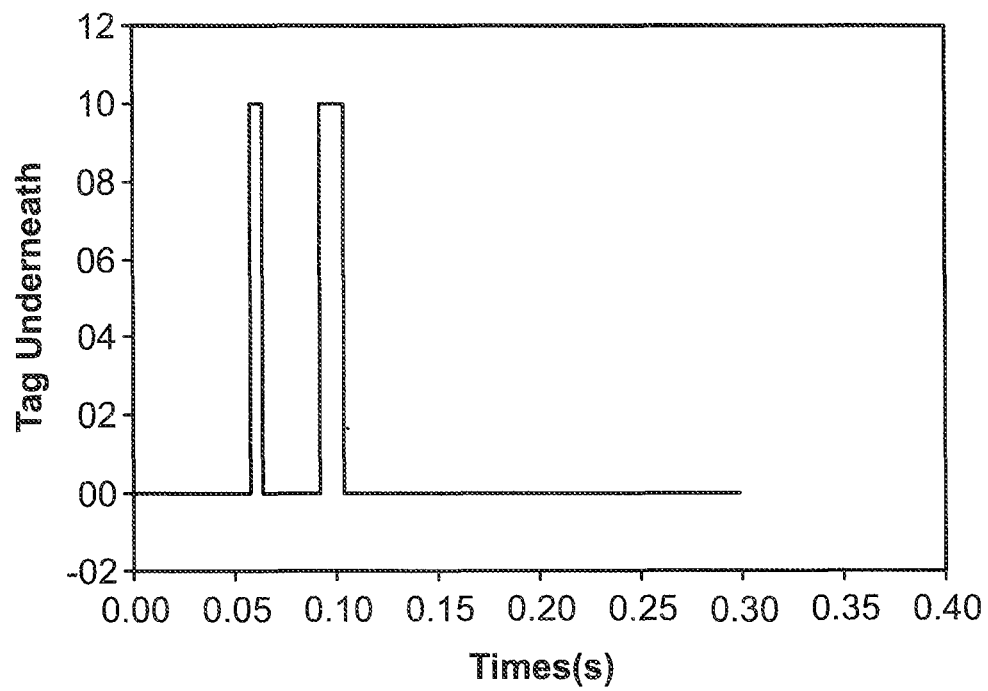
Figure 6D:
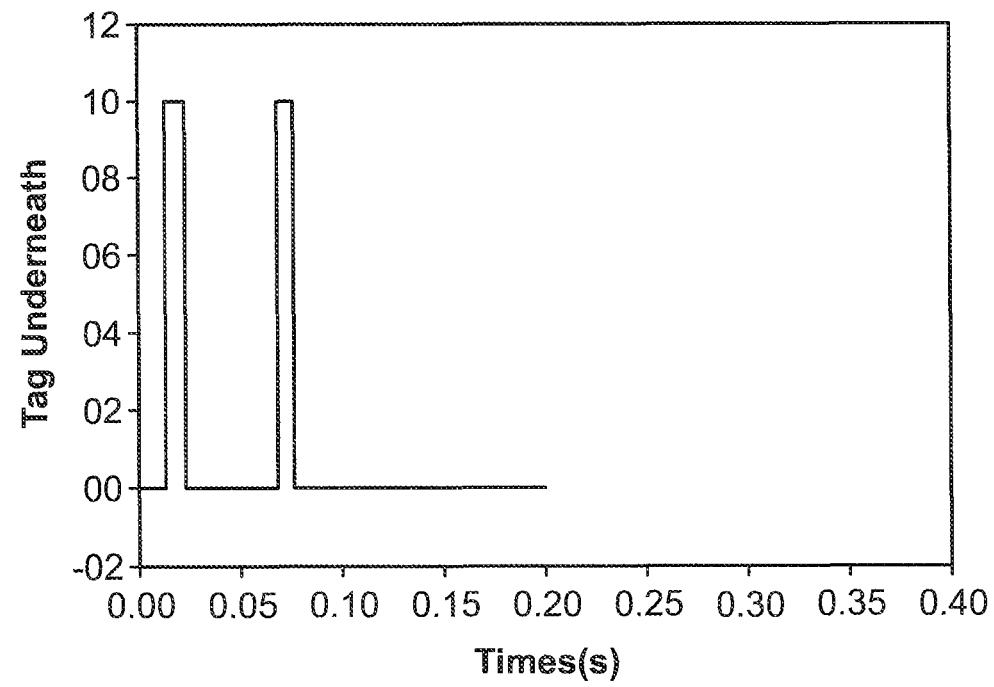
Figure 6E:
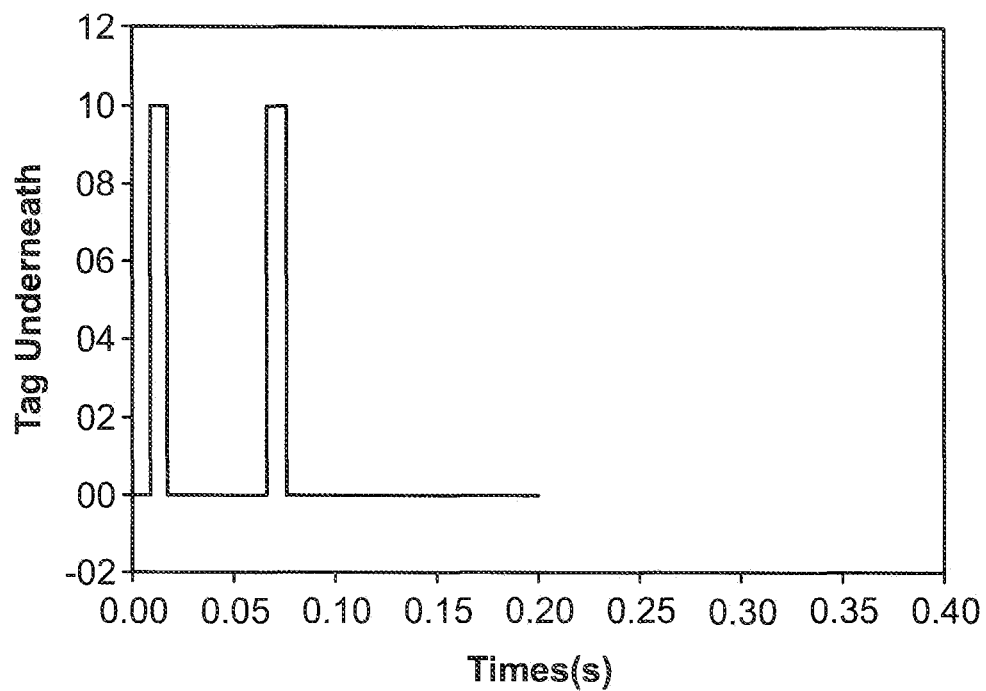
Figure 6F:
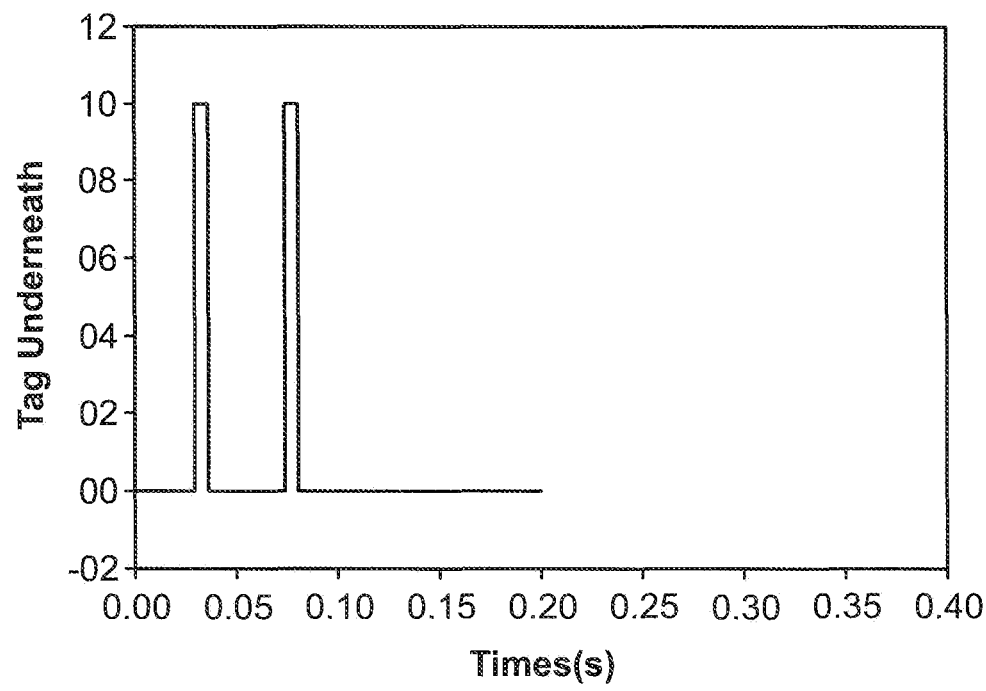

Returning to FIG. 4A, vehicle 110 drove in travel path 135 and captured GPS location information, shown as diamonds in FIG. 4B. Likewise, sensor data from the measured point 455 was plotted against the precalibrated GPS points 460, 461, 462, 463. The measured GPS locations from 8 different tests were all within the error range of the GPS module used in the test. As shown in FIGS. 3A-3H, vehicle speed can be estimated based on the amount of time it takes for the sensor to travel over the intelligent paint. FIGS. 5A-5B further show that vehicle speed can be estimated based on the travel time of the sensor on the label and the width of the label 520, 525.

As shown in FIGS. 6A-6E, sensors differentiate label widths of material (markers 120, 125), which can be used as informative codes by the vehicle. For example, the precise GPS coordinates of the locations 460, 461, 462, 463 in FIG. 4A can be barcoded within the paint/markings (120, 125). Barcoding can employ combinations of different numbers of markings, different strip widths, and/or different spacing between markings. In the graphs of FIGS. 6A-6E, different width strips (4 in. and 6 in.) were accurately measured as widths 664 and 666 and provided calibration of exact GPS coordinates.

Vehicles recognize locations directly under, or immediately ahead of, or adjacent to the sensor(s) in the subject vehicle so that the vehicle location, both laterally and longitudinally can be reliably and timely determined.

Vehicles can be equipped with the system of the invention to recognize standard highway paint/markings. The markings can be encoded with specialized message content based on the type of crystalline rare earth phosphors used in the markers. The markers can be located away from the vehicle as well, and their general or specific meaning can be determined based on the type of crystalline rare earth phosphors used. The markers are used to provide driver information and to control driving applications as outlined above. Accuracy, timeliness, distance, direction, and reliability of this recognition process can be specified.

Example 2: Vehicle Position Determination and Guidance

The system was physically configured similarly to the system used in Example 1 above. The system utilized the upconverting property of the crystalline rare earth phosphors to read the optical information from the markers. Y2O3:Er, Yb mixed with Yttrium Gallium Garnet (YGG:Cr) and La2SO2:Yb,Nd were mixed together with a clear film binder and laid down on the road at various positions. The detector was designed to activate the crystalline rare earth phosphors with an inexpensive telecom laser and read the result with a silicon detector. A band pass filter can be further employed to allow frequencies within an expected detection range to pass and to discriminate against signals at other frequencies.

The system tested two different excitation sources (Seminex Corporation part number TO9-105114) with Peak wavelength 1565 nm, 0.35 W CW, Single Mode, TO-9 tall cap, Lens collimated <10 mrad and a circular array of 800 nm high power LEDs, and a silicon detector (Laser Components Corporation part number SRS00, with silicon avalanche photodiode wavelength range <1100 nm, responsivity @90S nm 50 A/W) as the sensor.

The 1.55 infrared light emitted from the laser activated the crystalline rare earth phosphors in the intelligent paint, and the light was upconverted into the near IR region where a silicon detector converted the rise and decay times of the crystalline rare earth phosphors into useful information. The readings were sampled at 200,000 times per second. Thin 3-inch stipes were read while the vehicle was moving at 50 mph. In this particular case there was no need for filtration of the laser because the silicon detector (sensor) absorption cuts off at approximately 1100 nm. The only pulsed IR light that the sensor sees can only come from the crystalline rare earth phosphors. Nothing in nature will produce distinctive IR pulses. These capabilities of the system provide accuracy and reproducibility that is unmatched in prior systems. Unlike materials that simply "glow," these crystalline rare earth phosphors provide distinctive bits of information that can distinguish a line, a vehicle, a stop sign, and other important markers used to determine navigation.

Further, extrapolating information from rare earth crystalline rare earth phosphors enables vehicles to receive information with low cost sensors. In addition, rare earth crystalline rare earth phosphors can be used with current LIDAR equipment as well. Commercial Lidar systems utilize 905 nm lasers and 1.55 lasers (Veladyne HDL-64E) to scan the environment. The $La_2SO_2$:YbNd and $Y_2O_3$:ErYB crystalline rare earth phosphors are activated with LIDAR wavelengths and have conversion properties that can be detected, as described above. The YGG:ZnCr material converts visible light into the infrared spectrum and "afterglows" for a period of time. A commercial CCD camera with a filter system can distinguish this glow from normal white paint. The intelligent paint of the invention enhances the emission from the white paint in the IR region to distinguish from normal paint and provides a measure of safety not possible with other systems.

Example 3: Intelligent Roadway Marking Examples

The intelligent paints of the invention have unique and distinguishable optical signatures that afford a vast array of information relating to the surroundings. The information from the intelligent paint provides environmental and situational awareness to the vehicle and to the user.

Figure 7:
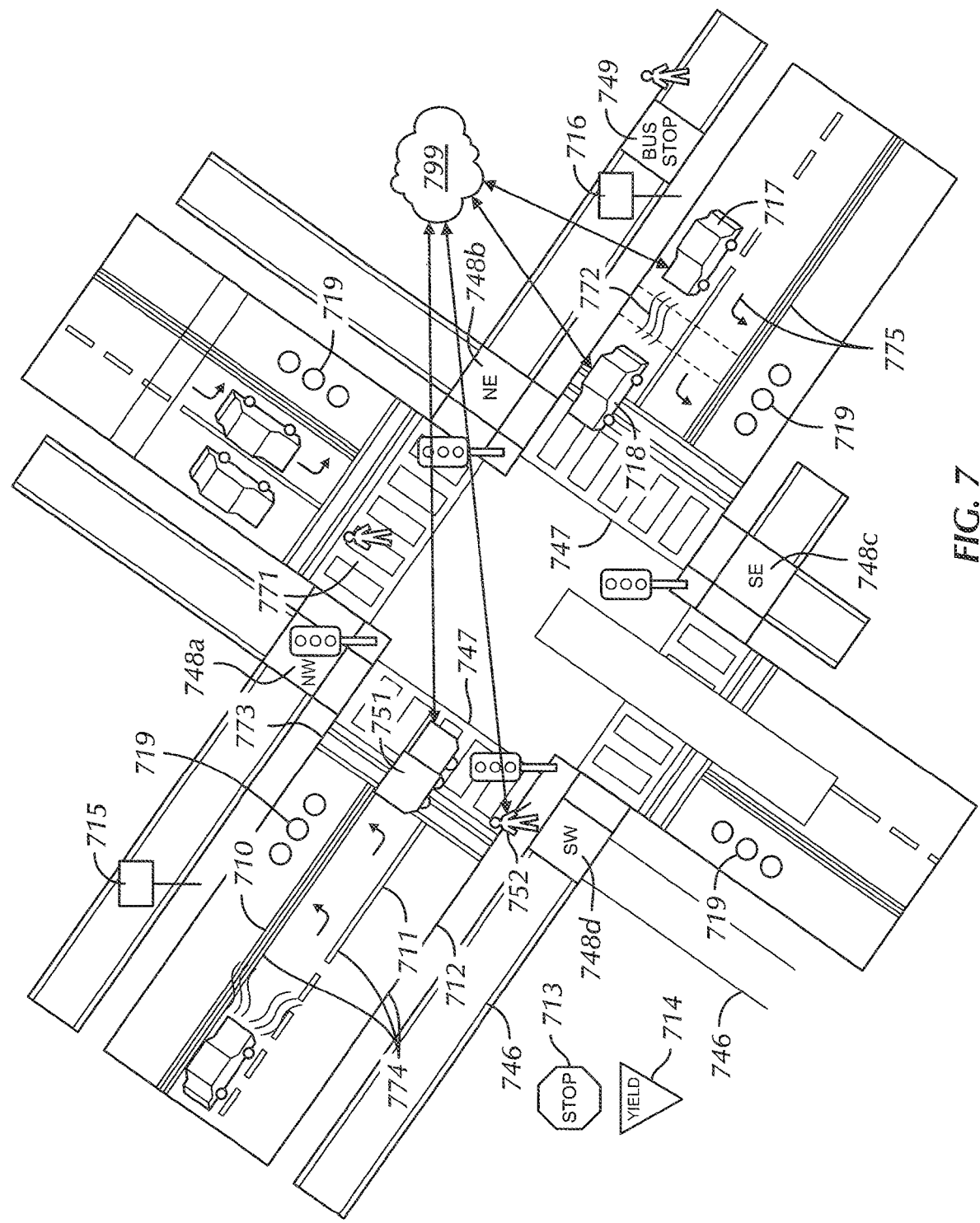

For example, the intelligent paint of the invention provides a variety of environmental feedback signals notifying vehicles and drivers of their exact situational environment. For instance, as shown in FIG. 7, intelligent paint provides optical identification for use with current roadway markings, such as double yellow lines 710, white skip lines 711, white lane designation lines 712, intersection markings 773, and signage, including stop signs 713, yield signs 714, speed limit signs 715, and bus stop signs 716. Vehicle mounted sensors (e.g., forward looking sensors) can detect these roadway markings and signage. Intelligent paint can be applied to identify pedestrian crosswalks 771, as clear lines 772 to provide GPS calibration and speed measurements to vehicles 717, 718 to establish speed, braking power, and other crash avoidance metrics. Visible or transparent thermoplastic markings that include infrared emitting intelligent materials can be also applied separately or in combination to a variety of road and sidewalk surfaces to provide precise gee-positioning coordinates that are used by GPS devices for improved spatial resolution and positioning. Visible or transparent marking with the intelligent materials can also be applied to sidewalk and pedestrian walkway surfaces designating locations such as bus stops 749, curb lines 746, upcoming intersection corners 747 and can also indicate gee-locations 748, including NE, SE, SW, NW. Additionally, intelligent paints are applied to specific markings 775 to increase roadway and lane visibility in adverse lighting and other environmental conditions that affect standard computer vision systems such as direct sunlight, fog, snow, and the like. The system shares the roadway and vehicle information among all users via network 799.

Example 4: Cooperative Airfield Vehicle Guidance and Traffic Control

Airport expansions and changing surface routes have increased airport traffic levels. The increased traffic levels bring higher risks of error causing air traffic delays and safety issues. An enormous amount of airfield traffic is monitored and controlled through airport control tower personnel under primarily visual, verbal (VHF/UHF radio), and radar-assisted guidance. The daily traffic control problems relate primarily to the high volume of air traffic and weather.

The intelligent paint of the invention is applied onto various airfield markings. The respective sensor units are easily and securely mounted onto airfield vehicles, including aircraft, passenger vehicles, buses, trams, re-fueling trucks, luggage vehicles, and the like. Intelligent paint systems are used to identify strategic locations on an airfield that pose increased safety risks and to provide commands to vehicle-mounted sensors to coordinate airfield traffic. Additionally, the intelligent paint and vehicle-sensor platforms are used in conjunction with commercially available, real-time video imaging and tracking algorithms. These systems create precise, in-environment GPS coordinates with optically bar-coded intelligent paints to provide additional information used in tracking and image analysis algorithms. The intelligent paint/markings and sensor platforms provide several advantages as a real-time, airfield traffic control system, including increased airfield safety and efficiency, reduced workload on air traffic control personnel, and reduced risk of human error by capitalizing on additional vehicle guidance and automation.

One specific example for use of the intelligent paint/markings and sensor platform for airfield markings is for the prevention of runway incursions. As defined by the Federal Aviation Administration, runway incursions are any occurrences at a location from which aircraft flight operations take place (aerodrome) that involve the incorrect presence of an aircraft, vehicle, or person on the protected area of a surface designated for the landing and takeoff of aircraft. The management and prevention of runway incursions is an on-going problem at every airfield and is a major concern impacting the safe and efficient operations at any airport. The three main causes of runway incursions are operational errors, pilot deviations, and vehicle/pedestrian deviations. Vehicle/pedestrian deviation incursions occur when a vehicle or pedestrian enters the runway safety area without authorization from air traffic control. Runway safety areas are designated locations on an airfield for the taxiing, takeoff, or landing of aircraft. According to the FAA, vehicle/pedestrian deviation incursions account for approximately 20% of total runway incursions.

Figure 8A:
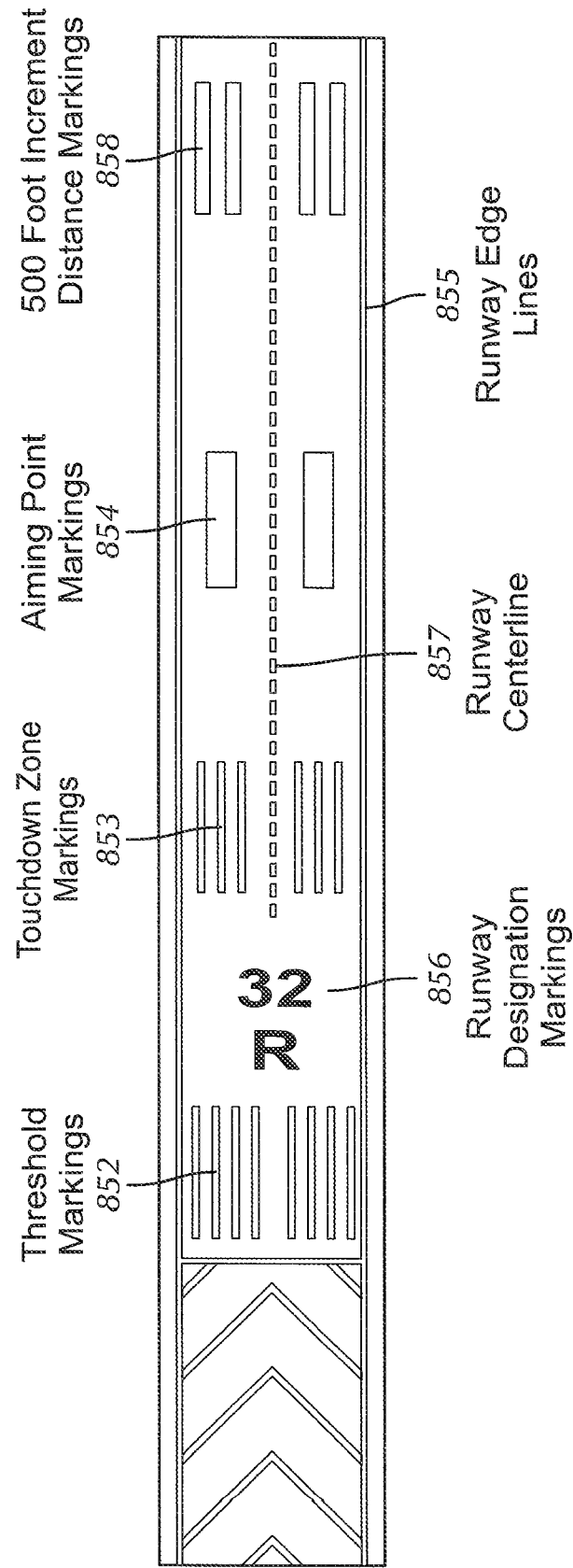
Figure 8C:
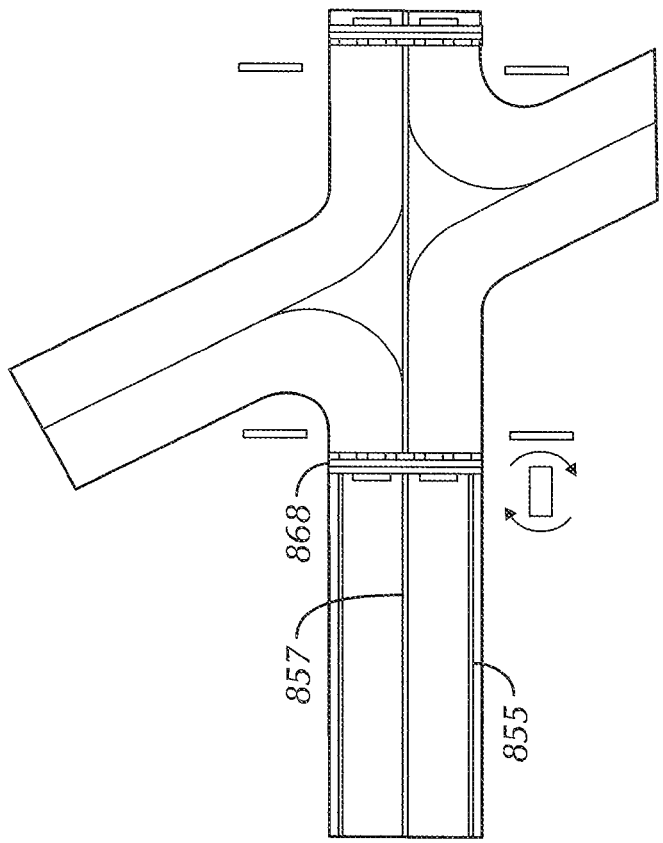
Figure 8B:
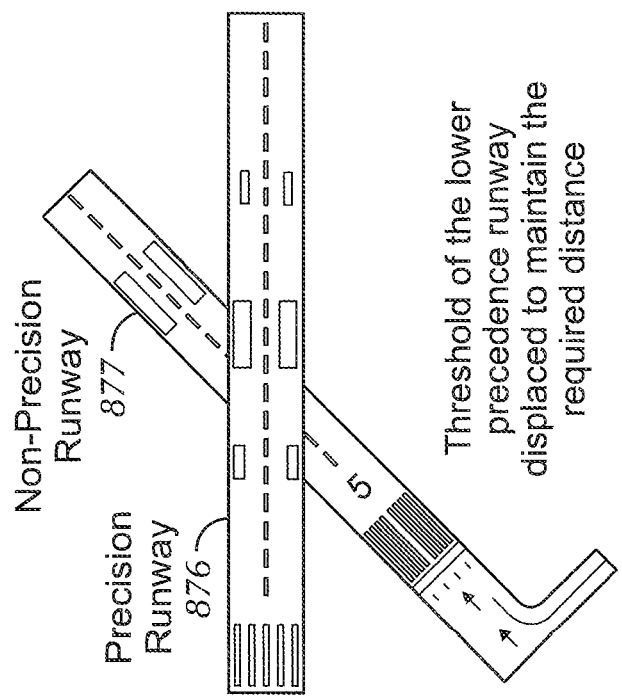

As shown in FIGS. 8A-8C, intelligent paint is applied at airfield locations to identify upcoming runway safety area boundaries or "hold lines" 868 used at service roads and other areas of the airfield where ground traffic is allowed to cross aircraft taxiways and runways upon tower approval. Vehicle mounted sensors monitor the vehicle route and notify the operator, control tower personnel, and other airfield/aircraft personnel of a runway incursion. Various vehicle controls are implemented, including vehicle guidance by the automated control of speed, braking, acceleration, deceleration, shut-off, and the like, similar to those actions described above with regard to the vehicle-highway cooperative communications systems.

Further implementation of intelligent paint in airfield markings provides real-time vehicle guidance and gee-positioning information for optical identification of airport markings. The intelligent paint/markings assist aircraft in landings and take-offs. As shown in FIG. 8A, the paint is used to identify various airfield markings such as threshold markings 852 that signal the width of the runway, touchdown zone markings 853 that identify touchdown zones for landing operations and provide distance information, aiming point markings 854 that provide a visual aiming point for a landing aircraft, and runway edge lines 855. Likewise, the intelligent paint systems provide markings for runway designations 856, runway centerlines 857, distance markings 858, and holding positions 868.

Further, the intelligent paint systems provide a further indication of precision and non-precision runways as shown in FIG. 8B. Non-precision runways are often used at small- to medium-size airports. These runways, depending on the surface, can be marked with threshold markings, designators, centerlines, and sometimes a 1,000 ft. mark and/or a 1,500 ft. mark (i.e., aiming points). The non-precision runways provide horizontal position guidance to planes on instrument approach via Non-directional beacon, VHF omnidirectional range, Global Positioning System, and the like. Precision instrument runways, which are normally found at medium- and large-size airports, include a blast pad/stopway (for airports handling jets), threshold markings, designator, centerline, aiming point, and 500 ft., 1,000 ft./1,500 ft., 2,000 ft., 2,500 ft., and 3,000 ft. touchdown zone marks. Precision runways provide both horizontal and vertical guidance for instrument approaches.

The intelligent paints of the invention have unique and distinguishable optical signatures that afford a vast array of information relating to the airfield surroundings. The information from the intelligent paint provides environmental and situational awareness to the vehicles, user, and control tower personnel.

Figure 9:
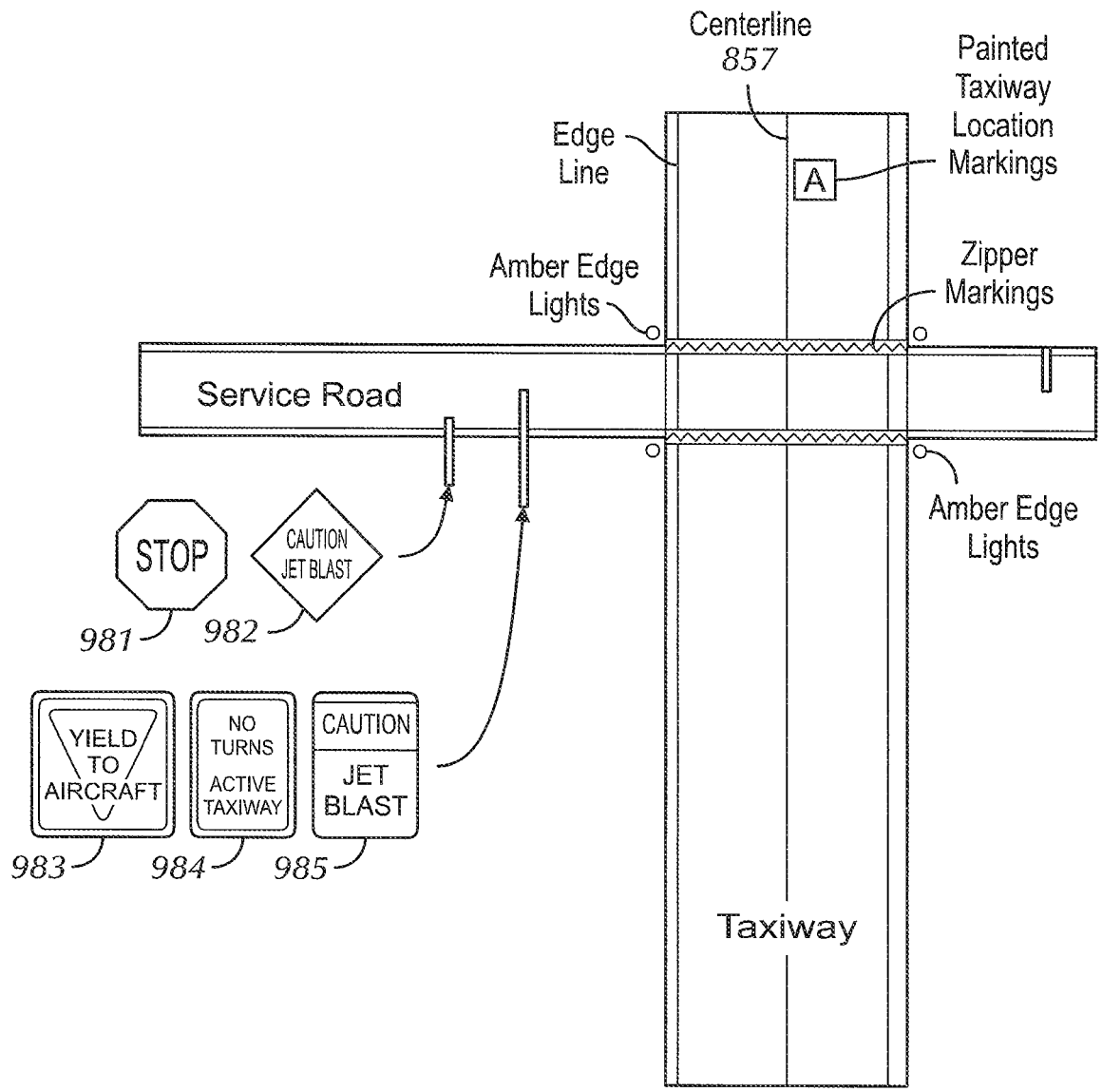

FIG. 9 shows additional examples of airfield use, where the intelligent paint and crystalline rare earth phosphors can be incorporated in a variety of non-ground signals, such as stop signs 981, caution signs 982, and other informational signs 983, 984, 985 to provide additional information to the users as an added measure of safety.

Example 5: Intelligent Paint for Pedestrian Guidance

Smart and connected community ecosystems must better accommodate the long-standing needs of the diverse, varied pedestrian populations impacted by the interaction with vehicles in these environments. Chief among these are the blind or visually impaired (BVI) populations who already face existing challenges in navigating their local communities. According to a 2015 study from the Cornell University Yang Tan Institute on Employment and Disability, recent estimates indicate that more than 7.2 million within the US are BVI. The number of adults who are legally blind is expected to double by 2050 according to visual impairment and blindness demographic and geographic estimates from the Journal of the American Medical Association Ophthalmology Group. Blindness results in limitations to one's range and variety of experiences, the ability to navigate one's community and interactions with the environment in support of the overall workforce. Unfortunately, GPS-based solutions have limited accuracy (+/−30 m) and are thus incapable of informing users if they are walking on a sidewalk or down the middle of the street. Exacerbating this is the predicted increase in quieter, electrically propelled cars that eliminates one of the chief tools—sound—that people who are BVI constantly use to enable safer, more confident navigation of crosswalks and intersections.

With the rapid increase of vehicle automation and the likelihood of unmanned vehicles becoming commonplace on public highways and roadways, it is ever more important that the frequency and type of interactions between automated vehicles and pedestrians are well understood and risks to public safety can be mitigated. Variation city to city of traffic patterns and pedestrian routes highlights the need for an integrated paint and sensor platform that can also be used by pedestrians and shared between pedestrians and vehicles.

Figure 10:
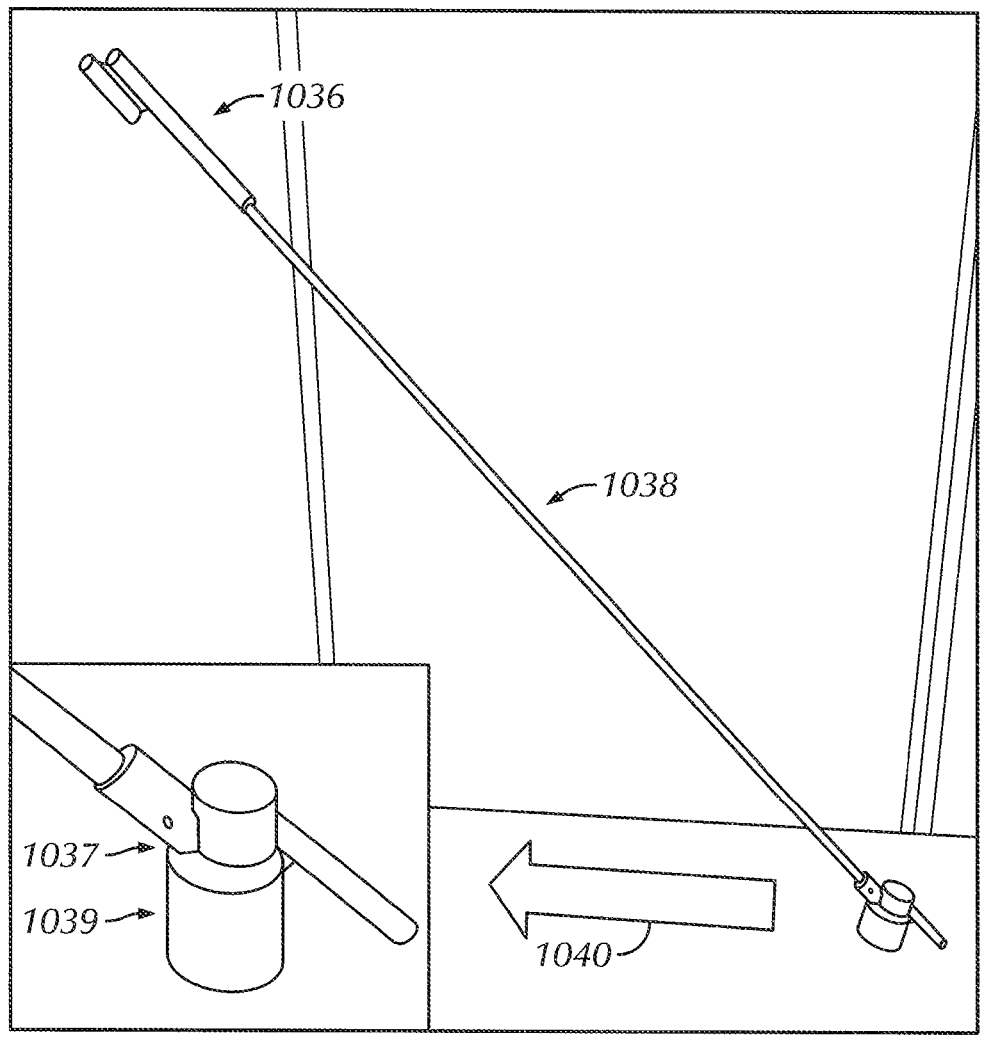

The intelligent paint of the invention is used for pedestrian guidance and safety for those with visual and/or cognitive impairments. Visual cues that the majority of people take for granted are absent for blind and low vision individuals. This results in significant barriers to their ability to travel safely within existing cities. To address the needs of this population of people, the vehicle-borne sensor platform was miniaturized and slightly modified to be used in conjunction with the "white" canes 1038 used by the visually impaired as shown in FIG. 10. The cane 1038 includes a handle mounted control unit 1036 that includes a user feedback mechanism and a power source and a tip unit 1040 with embedded excitation source and sensor 1039. The cane 1038 includes wireless connectivity using a variety of networks and standards, including Bluetooth, 4G, and the like, to enable communication with mobile devices and GPS.

The systems and methods of the invention connect these mobility-challenged populations to provide network enabled, precise location services to those unable to navigate by sight. As outlined above, the invention uses light-converting oxides that sequentially absorb two or more photons followed by emission of a single photon having a different energy as described in U.S. Pat. No. 9,181,477 noted above. More specifically, certain oxides exhibit downconversion, an optical process in which absorbed photons create longer wavelength photons. These materials can emit 980 nm light after absorption of 940 nm light. One advantage of such wavelengths is that they can stimulate emissions while also efficiently penetrating organic matrices common to pavement and sidewalk markings. As shown in FIG. 10, the optics 1037 to detect intelligent paint that includes downconverting oxides can be mounted on a blind cane 1038 to detect the presence of unique spectral features emitted by these oxides. 2

The increasingly complicated geometry of modern intersections, including the tasks of finding the crosswalk, aligning to cross, and maintaining crossing direction while in motion, have become increasingly difficult. As shown in FIG. 7, the intelligent paint can be applied to various pedestrian walkways providing safe route guidance. Optically coded paints can serve as identifiers of "grass lines" or curb edges 746 highlighting safe routes. The intelligent paint and sensor-embedded cane 1038 can also be used for guidance across intersections 771 and identification of directional coordinates 748 (e.g., NW, SW, NE, SE intersection corners) and bus stops 749. A mobile device app (graphical user interface not shown separately) provides a variety of audio cues for pedestrian guidance.

A visually-impaired pedestrian using the sensor-embedded cane 1038 approaches a pedestrian intersection 747 and receives an audible notification from the system that a "walk sign" is on or some other verbal and/or audio cue. As the cane 1038 accesses the ambient Wi-Fi for detailed spatial information, the presence of the user is made spatially apparent to the system. However, in instances of high traffic volume, intersections 747 are regularly blocked by a vehicle 751 despite the audible signal that it is clear to walk. Without the intelligent sensor, the visually-impaired pedestrian 752 would not be aware of the vehicle 751 in the environment and would be at increased risk of injury. Similarly, the vehicle 751 blocking the pedestrian walkway (intersection 747) is also equipped with an intelligent sensor recognizes the intelligent paint designating the intersection 747. In the context of autonomous vehicle control, as the pedestrian steps out into an intersection 771, the interaction between the cane 1038 and intelligent paint would make all autonomous vehicles in the area aware of the presence of the BVI user (or users) with a high degree of certainty. The system sends information from the vehicle 751 to the network 799 and relays the information to the visually impaired pedestrian 752 using the feedback mechanism 1036 of the cane 1038. Intelligent paint deployment creates new methods for the collection, management, and analysis of accurate, cm-level data describing the motion and travel of the BVI in Intelligent and Connected Community environments. This leads to new understanding and opportunities for improving travel safety and efficiency.

Likewise, the intelligent paint systems of the invention benefit the general public with no physical or cognitive impairments. The system and platform can be modified to be embedded in or attached to various footwear or other wearable devices as well as bicycles, wheelchairs, service dogs, and the like to reduce the risk of negative interactions between automated vehicles. The systems provide true connectivity between vehicles and pedestrians to provide a higher degree of safety than previous systems.

We claim:

1. A cane for individuals who are visually impaired, comprising:
    a tip portion comprising:
        an excitation source configured to excite phosphors, including a first crystalline rare earth phosphor and a second crystalline rare earth phosphor in a surface-coating composition; and
        a sensor configured to detect the emission of
    the phosphors excited by the excitation source;
    wherein the surface-coating composition comprises the first crystalline rare earth phosphor, the second crystalline rare earth phosphor, and a polymeric material as a binder, where the first and second crystalline rare earth phosphors are capable of absorbing infrared light, and where the first and second crystalline rare earth phosphors have different decay times.

2. The cane according to claim 1, wherein the excitation source emits a wavelength of 940±10 nm.

3. The cane according to claim 1, wherein the sensor is configured to detect emissions of a phosphor emitting a wavelength of 980 nm.

4. The cane according to claim 1, further comprising a wireless communication interface.

5. The cane according to claim 4, wherein the wireless communication interface is configured to utilize Wi-Fi.

6. The cane according to claim 4, wherein the cane is configured to wirelessly communicate with a vehicle.

7. The cane according to claim 6, wherein the cane is configured to provide an audible notification based on information received from a vehicle.

8. The cane according to claim 1, further comprising GPS.

9. The cane according to claim 1, further comprising:
    a speaker configured to provide an audible notification; and
    a power source.

10. The cane according to claim 1, wherein the cane is configured to identify a curb edge based on an identification of the phosphors.

11. A system, comprising:
    a cane according to claim 1, held by a user;
    a vehicle; and
    a remote server in operable communication with the cane and the vehicle,
    wherein the cane is configured to send information to the remote server when the cane detects a user enters the crosswalk and the cane is configured to receive information from the remote server when a vehicle is present in the crosswalk.

* * * * *

UNITED STATES PATENT AND TRADEMARK OFFICE
CERTIFICATE OF CORRECTION

PATENT NO. : 11,667,799 B2
APPLICATION NO. : 17/147818
DATED : June 6, 2023
INVENTOR(S) : Howard Y. Bell et al.

It is certified that error appears in the above-identified patent and that said Letters Patent is hereby corrected as shown below:

In the Claims

Column 20, Line 32, Claim 2, "940-10 nm" should read "940±10 nm"

Signed and Sealed this
Eighteenth Day of July, 2023

Katherine Kelly Vidal
*Director of the United States Patent and Trademark Office*